(12) United States Patent
Ozeki et al.

(10) Patent No.: US 7,090,612 B2
(45) Date of Patent: Aug. 15, 2006

(54) CONTROL DEVICE OF HYBRID DRIVE UNIT AND CONTROL METHOD THEREOF

(75) Inventors: Tatsuya Ozeki, Nisshin (JP); Hiroatsu Endo, Nagoya (JP); Masahiro Kojima, Okazaki (JP); Masataka Sugiyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 10 days.

(21) Appl. No.: 10/739,286

(22) Filed: Dec. 19, 2003

(65) Prior Publication Data

US 2004/0192494 A1    Sep. 30, 2004

(30) Foreign Application Priority Data

Dec. 25, 2002    (JP) ............................. 2002-374971

(51) Int. Cl.
  *B60K 1/02* (2006.01)
(52) U.S. Cl. ........................................................ 477/3
(58) Field of Classification Search .................... 477/2, 477/3; 180/65.2, 65.7
  See application file for complete search history.

(56) References Cited

U.S. PATENT DOCUMENTS

| 3,623,568 | A | 11/1971 | Mori et al. |
|---|---|---|---|
| 5,088,354 | A | 2/1992 | Asada |
| 5,257,189 | A | 10/1993 | Asada |
| 5,847,469 | A | 12/1998 | Tabata et al. |
| 5,887,670 | A | 3/1999 | Tabata et al. |
| 5,951,614 | A | 9/1999 | Tabata et al. |
| 6,344,008 | B1 | 2/2002 | Nagano et al. |
| 6,371,878 | B1 | 4/2002 | Bowen |
| 6,685,591 | B1 | 2/2004 | Hanyu et al. |
| 6,867,509 | B1 * | 3/2005 | Takaoka et al. .......... 290/40 A |
| 2002/0055411 | A1 | 5/2002 | Yoshiaki et al. |

FOREIGN PATENT DOCUMENTS

| CN | 1296889 | 5/2001 |
|---|---|---|
| DE | 198 49 156 A1 | 9/1999 |
| DE | 100 08 344 A1 | 8/2000 |
| DE | 101 22 713 A1 | 2/2002 |
| DE | 100 58 020 A1 | 5/2002 |
| DE | 101 53 476 | 5/2002 |
| EP | 0 641 684 | 3/1995 |
| EP | 1 236 603 A2 | 9/2002 |
| JP | 47-31773 | 8/1972 |
| JP | 6-319210 | 11/1994 |
| JP | 9-9414 | 1/1997 |
| JP | 9-233606 | 9/1997 |
| JP | 09-308008 | 11/1997 |

(Continued)

*Primary Examiner*—Dirk Wright
(74) *Attorney, Agent, or Firm*—Oblon, Spivak, McClelland, Maier & Neustadt, P.C.

(57) ABSTRACT

A control device of a hybrid drive unit, wherein an output member is connected to a first prime mover, and wherein a second prime mover capable of outputting at least one of a positive torque and a negative torque is connected through a transmission to said output member, comprising: a running restriction judger for judging that a running control of at least one of said first prime mover and said second prime mover is restricted, and a shift point changer for changing a shift point, in which a decision of a gear shift of said transmission is to be satisfied when the running restriction judger judges that the running control is restricted, different from the shift point of a case in which the running control is not restricted.

28 Claims, 13 Drawing Sheets

FOREIGN PATENT DOCUMENTS

| | | |
|---|---|---|
| JP | 09-331602 | 12/1997 |
| JP | 10-004606 | 1/1998 |
| JP | 10-23607 | 1/1998 |
| JP | 2000-220731 | 8/2000 |
| JP | 2000-295709 | 10/2000 |
| JP | 2000-295720 | 10/2000 |
| JP | 2001-146121 | 5/2001 |
| JP | 2001-153218 | 6/2001 |
| JP | 2001-173773 | 6/2001 |
| JP | 2002-225578 | 8/2002 |
| JP | 2002-262409 | 9/2002 |
| JP | 2002-274201 | 9/2002 |
| JP | 2003-130199 | 5/2003 |
| WO | WO 98/31559 | 7/1998 |
| WO | WO 02/06072 | 1/2002 |

* cited by examiner

CONTROL DEVICE OF HYBRID DRIVE UNIT AND CONTROL METHOD THEREOF

BACKGROUND OF THE INVENTION

1. Field of the Invention

This invention relates to a hybrid drive unit provided with two kinds of prime movers as a power source for driving a vehicle, and more particularly, to a control device for a hybrid drive unit, wherein a second prime mover is connected through a transmission to an output member, to which a power is transmitted from a first prime mover.

2. Related Art

An example of a control device of hybrid drive unit of this kind is disclosed in JP-A-2002-225578. In this publication, there is described the hybrid drive unit, in which an engine and a first motor generator are connected to each other through a synthesizing/distributing mechanism composed of a single pinion type planetary gear mechanism while an output member is connected to the synthesizing/distributing mechanism in a torque transmittable manner, and in which a second motor generator is connected to the output member through a gear shift mechanism.

According to the hybrid drive unit described in this publication, therefore, a torque synthesized from an output torque of an engine and a torque of the first motor generator in accordance with a gear ratio of the single pinion type planetary gear mechanism appears on an output shaft, and an engine speed can be controlled by the first motor generator. Therefore, it is possible for the engine to be driven for the optimum fuel consumption thereby to improve a fuel consumption of a vehicle. Moreover, the torque can be applied to the output shaft, by generating an electric power (i.e., regeneration of energy) by the first motor generator so as to drive the second motor generator by the electric power generated, when the engine is being driven at the optimum fuel consumption. Therefore, sufficient driving force can be obtained without deteriorating the fuel consumption. Moreover, the torque outputted by the second motor generator can be raised and transmitted to the output shaft, by having an gear ratio to be set by the transmission greater than "1". And in case the gear ratio is reduced (e.g., in case the transmission is set in a high speed stage), a speed of the second motor generator can be decreased so that the second motor generator can be changed into a low power type or a small size type.

The aforementioned hybrid drive unit is so-called "mechanical distribution type", and the same type of the hybrid drive unit is disclosed in JP-A-2000-295709. The unit disclosed in this publication is so constructed as to control the torque of individual motor generator when the gear shift is executed by the transmission.

Also, a motor-driven vehicle, in which the output torque of the electric motor is transmitted through the transmission to the output shaft is disclosed in JP-A-6-319210. In the vehicle disclosed in this publication, the torque of the electric motor and an apply pressure of the clutch at the shifting time is controlled with judging the situation at the shifting time.

In JP-A-2000-295720, moreover, there is described a so-called "series type hybrid drive unit", in which a electric generator is driven by the engine, and in which the electric motor is driven by an electric power generated by the electric generator. In this device, the gear shift is inhibited in case of driving on a downhill having a gradient steeper than the predetermined value.

In JP-A-9-9414, still moreover, there is described a hybrid drive unit, which is constructed to change a shift point on the basis of a remaining amount SOC (i.e., State of Charge) of the battery. Also, in JP-A-9-233606, there is described a hybrid drive unit, in which the vehicle is driven by the motor with reducing the gear ratio in the case the charging amount SOC remains sufficiently, and in which the vehicle is driven by the engine with greatening the gear ratio in the case the charging amount SOC does not remains sufficiently, on the contrary.

In the aforementioned so-called "mechanical distribution type" hybrid drive unit, as described in JP-A-225578, the second motor generator is connected through the transmission to the output shaft. Therefore, in case that the gear shift is made under the state where the second motor generator is controlling the run into a power mode or a regenerative mode, a transmission torque by the transmission falls during the shifting operation. As a result of this, the output shaft torque is changed and it may cause shocks. On the other hand, this hybrid drive unit is constructed to synthesize the output torque of the engine and the torque of the first motor generator by a planetary gear mechanism, as they are outputted, so that the output shaft torque can be controlled by the first motor generator. Therefore, it is considerable to control the first motor generator thereby to suppress or prevent such torque change at the shifting time by the transmission.

Since the first motor generator and the engine are connected through the planetary gear mechanism, as thus far described, the torque which acts on the engine as a reaction is changed when, for example, the torque of the first motor generator is changed in order to raise the output shaft torque. The engine does not output the torque when the vehicle is driven by the torque of the second motor generator with the engine being halted. Therefore, in case that the torque of the first motor generator is changed so as to suppress the reduction of the output shaft torque at the shifting time in the transmission, the torque to rotate the engine backward may act on the engine. Because it is not preferable for the engine to be rotated backward, after all, it is not possible to suppress the reduction of the output shaft torque as might otherwise accompany the gear shift in the transmission, when the vehicle is running in so-called "EV run" in which the vehicle is run by the torque of the second motor generator.

On the other hand, aforementioned first motor generator and second motor generator can perform as either the electric motor or the electric generator, so that the fall of the output shaft torque can be suppressed by controlling the torque of those motor generators variedly at the shifting time in the transmission, when the vehicle runs with using those motor generators. However, in case of raising a positive torque, which is to be outputted by any of those motor generators, the output of an accumulator device such as the battery has to be raised. In order to raise a negative torque, on the contrary, it is necessary for the accumulator device to accept the generated electric power.

Specifically, the accumulator device participates in the torque control by the motor generator, but a capacity of the accumulator device is limited. Therefore, the accumulator device cannot drive the motor generator or raise the output torque thereof, when the stored amount of electricity (charging amount) is low. When the stored amount of electricity (charging amount) is almost full, on the contrary, the accumulator device cannot accept the electric power so that the negative torque by the regenerative control of the motor generator cannot be raised. This kind of restriction on the control of the motor generator caused by the accumulator device may arise not only from the stored amount of electricity (charging amount), but also from the temperature etc. After all, the control of the motor generator is restricted according to the situation of the accumulator device functioning as an energy source of the motor generator, even if there is no trouble on the motor generator. As a result, the change of the output shaft torque at the shifting time in the transmission cannot be suppressed, and this makes it probable that the deterioration in the shocks cannot be prevented.

SUMMARY OF THE INVENTION

The present invention has been conceived noting the technical problems thus far described and its object is to provide a control device for a hybrid drive unit, which can suppress or prevent shocks as might otherwise accompany the gear shift by the transmission or deterioration in a riding comfort, even if a torque control of any of a first prime mover or a second prime mover capable of applying the torque to the output member is restricted.

In order to achieve the above-specified objects, this invention is characterized by the construction, in which the shift point is changed so as to have the torque fluctuation accompanying the gear shift in the transmission small. Specifically, according to the present invention, there is provided a control device of the hybrid vehicle, wherein the output member is connected to the first prime mover, and wherein the second prime mover capable of outputting at least one of a positive torque and a negative torque is connected through the transmission to the output member, comprising: a running restriction judging means or judger for judging that a running control of at least one of the first prime mover and the second prime mover is restricted; and a shift point changing means or changer for changing the shift point, in which a decision of the gear shift in the transmission is to be satisfied when the running restriction judging means or judger judges that the running control is restricted, different from the shift point of the case, in which the running control is not restricted.

According to the control device of the invention, therefore, in case the control of the running state of the first prime mover or the second prime mover is restricted, the shift point to decide the gear shift in the transmission is changed in comparison with the case that the running control is not restricted. As a result, the gear shift is executed in the transmission at the timing appropriate for the torque generated on the output member, and the shocks accompanying the gear shift is lightened or prevented.

Moreover, the control device according to the invention further comprising: an energy accumulator for outputting an energy to said first prime mover or second prime mover, or for storing an energy regenerated by any of the prime movers; and wherein said running restriction judging means or judger includes a means or judger for judging the driving restriction on the basis of a condition of the energy accumulator.

In the control device according to the invention, therefore, the restriction on said running control is judged on the basis of the condition of the energy accumulator which outputs the energy to any of the prime movers and accepts the energy from any of the prime movers. As a result, the shift point is changed in case the energy cannot be outputted sufficiently or in case the energy cannot be accepted, so as to lighten or prevent the shocks.

In the control device according to the invention, moreover, at least any of said first prime mover and second prime mover regenerates the energy, and said drive restriction judging means or judger includes a means or judger for judging the restriction on said running control in case the acceptance capacity of said energy accumulator for energy is smaller than a predetermined value, and said shift point changing means or changer include a means or changer for changing said shit point to the low load side where the demand load for said hybrid vehicle is relatively low, in case the restriction on said running control is judged.

In the control device according to the invention, therefore, the restriction on the running control of the prime mover is judged in case the energy accumulator cannot accept the energy regenerated by any of the prime mover, or in case the acceptance of the energy regenerated by any of the prime mover is restricted. In this case, the shift point to decide the gear shift in the transmission is changed to the relatively low load side. In case the change in the output torque at the shifting time in the transmission cannot be suppressed sufficiently by the regenerative torque, therefore, the gear shift is executed in the relatively low load state. As a result, the change in the torque as might otherwise accompany the gear shift becomes so small that the fluctuation of the torque itself is small, and accordingly, the change in the output torque can be suppressed so as not to cause shocks even if the regenerative torque is small.

In the control device according to the invention, still moreover, said first prime mover includes a regenerating mechanism for regenerating the energy, and there is further provided an output torque correcting means or corrector for correcting the torque to be transmitted from the first prime mover to said output member to a rising side by changing the regeneration amount of said regenerating mechanism at the shifting time.

In the control device according to the invention, therefore, the regeneration of the energy is executed by the regenerating mechanism in the first prime mover at the shifting time in the transmission. And in connection with this, the torque acting on the output member is changed thereby to suppress the change in the torque of the output member at the shifting time. However, the gear shift is executed in the relatively low load state, even if the change in the regenerative torque is small owing to the restriction of the running control of the first prime mover, more specifically, the restriction of the regenerative control of the regenerating mechanism.

Therefore, it is possible to suppress or prevent the shocks. According to the invention, on the other hand, there is provided a control device, in which a status of said energy accumulator is at least any of an allowable output amount as an energy amount possible to be outputted by said energy accumulator and an acceptance capacity of said energy accumulator for energy, in which said running restriction judging means or judger includes a means or judger for judging the restriction on said running control in case said allowable output amount or acceptance capacity is lower than the predetermined value, and in which said shift point changing means or changer includes a means or changer for changing said shift point relatively to the low speed side in case the restriction on said running control is judged.

In the control device according to the invention, therefore, in case the running control of any of the prime movers is restricted by the allowable output amount or acceptance capacity of the energy accumulator, the shift point to decide the gear shift in the transmission is changed relatively to the low speed side. Therefore, the gear shift of the case, in which any of the prime mover cannot be sufficiently controlled to suppress the change in the output torque at the shifting time, is caused relatively in the low speed state. As a result, the time period necessary for the gear shift is shortened, so that the torque change due to the gear shift under the state where any of the prime mover cannot be sufficiently controlled is ended within a short period of time, and the shocks as might otherwise accompany the gear shift becomes hard to be felt or light. In addition to this, in case the gear shift is executed by interchanging the applied/released states of the frictional engagement device, the amount of energy to be absorbed by a frictional member becomes small. This is advantageous to improve the durability.

According to the invention, moreover, there is provided a control device, in which a status of said energy accumulator is an allowable output amount as an energy amount possible to be outputted by said energy accumulator, in which said running restriction judging means or judger includes a means or judger for judging the restriction on said running control in case said allowable output amount is lower than the predetermined value, and in which said shift point changing means or changer includes a means or changer for changing said shift point to the low load side where the demand load for said hybrid drive unit is relatively small.

In the control device according to the invention, therefore, in case the energy amount possible to be outputted by the energy accumulator to any of the prime movers at the shifting time in the transmission is restricted, the shift point to decide the gear shift in the transmission is changed relatively to the low load side. Therefore, the change in the output torque as might otherwise accompany the gear shift in the transmission becomes small so that the shocks are hard to occur. Moreover, the change in the output torque is also suppressed by the restricted running control of any of the prime movers. Therefore, shocks are prevented or relaxed also in this respect.

According to the invention, moreover, there is provided a control device, in which any of said prime mover is said second prime mover including a drive unit for outputting the torque by receiving the energy from said energy accumulator, and further comprising: a drive controlling means or controller for outputting the torque from said drive unit at the shifting time of the transmission.

In the control device according to the invention, therefore, the torque possible to be outputted by the second prime mover at the shifting time becomes small by the restriction on the running control. However, the gear shift is caused in the low load state so that the change in the output torque can be suppressed even if the output torque is a small corrected torque of the second prime mover. As a result, the shocks are prevented or relaxed.

According to the invention, still moreover, there is provided a control device, in which a status of said energy accumulator is at least any of an allowable output amount as an energy amount possible to be outputted by said energy accumulator and an acceptance capacity of said energy accumulator for energy, in which said running restriction judging means or judger includes a means or judger for judging the restriction on said running control in case said allowable output amount or acceptance capacity is lower than the predetermined value, and further comprising: a gear ratio fixing means or device for fixing the gear ratio of said transmission from a starting time of a vehicle having said hybrid drive unit, in case the restriction on said running control is judged.

In the control device according to the invention, therefore, in case the running control of any of the prime movers is restricted by the allowable output amount or the acceptance capacity of the energy accumulator, the gear ratio at the starting time of the vehicle is kept so as not to cause the gear shift in the transmission. Therefore, the gear shift is not caused in the state where the correction of the torque by any of the prime mover cannot be sufficiently executed, so that the shocks are not deteriorated.

According to the invention, moreover, there is provided a control device, in which said second prime mover includes an electric motor for outputting a motive power to run the vehicle to said output member with the first prime mover being stopped, and further comprising: a gear shift regulating means or regulator for regulating the gear shift in said transmission when the vehicle is run by the motive power outputted from said electric motor.

In the control device according to the invention, therefore, the gear shift in the transmission is regulated, under the state where the vehicle is run by the second prime mover connected through the transmission to the output member. Therefore, the gear shift and the accompanying fluctuation of the torque is not caused, or the fluctuation is regulated, under the state where the output torque cannot be so-called "compensated" by the first prime mover, so that the shocks are suppressed or prevented.

According to the invention, still moreover, there is provided a control device, further comprising: a shifting time torque correcting means or corrector for correcting the torque outputted from said first prime mover at the shifting time in said transmission to the rising side.

In the control device according to the invention, therefore, the output torque of the first prime mover is corrected to the rising side at the shifting time in the transmission, under the state where the torque can be outputted and raised by the first prime mover. Therefore, the torque of the output member during the shifting operation in the transmission is compensated by the torque of the first prime mover, and the fall of the output torque at the shifting time or the shock as might otherwise be caused by the fall of the output torque is prevented or suppressed.

In addition, the control method of the present invention is executed by the aforementioned individual control device. According to the control method of the invention, therefore, uncomfortable feeling such as the shocks and so on are prevented or suppressed by changing the shift point of the transmission in case the running control of any of the prime mover is restricted.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

BEST MODE FOR CARRYING OUT THE INVENTION

Figure 10:
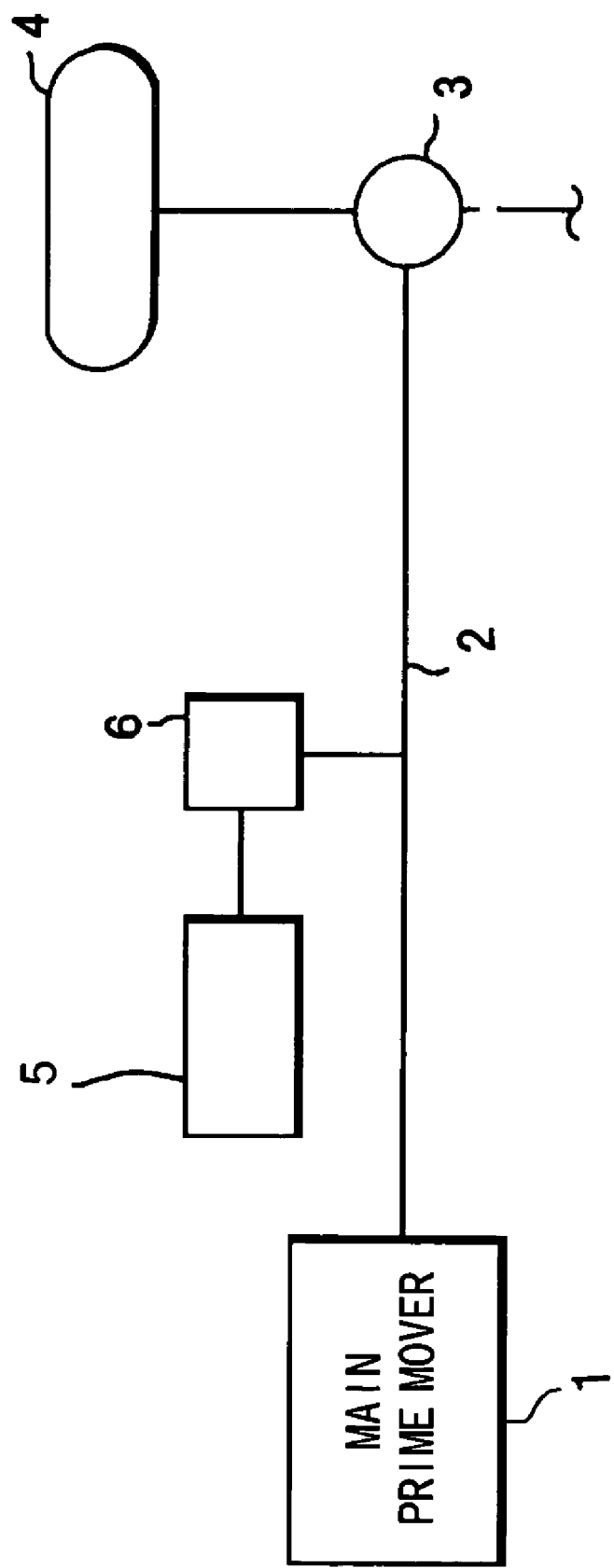
FIG. 10 is a block diagram schematically showing one example of a hybrid drive unit, to which this invention is applied.

This invention will be described in connection with its specific examples. The first description is made on a hybrid drive unit, to which is this invention is applied. The hybrid drive unit or an application target of this invention is mounted on a vehicle, for example. As shown in FIG. 10, the torque of a main prime mover 1 is transmitted to an output member 2, from which the torque is transmitted through a differential 3 to drive wheels 4. On the other hand, there is provided an assist prime mover 5, which can make a power control to output a driving force for a drive and a regenerative control to recover an energy. This assist prime mover 5 is connected through a transmission 6 to the output member 2. Between the assist prime mover 5 and the output member 2, therefore, the transmission torque capacity is increased/decreased according to a gear ratio to be set by the transmission 6.

This transmission 6 can be constructed to set the gear ratio at "1" or higher. With this construction, at the power running time for the assist prime mover 5 to output the torque, this torque can be outputted to the output member 2 so that the assist prime mover 5 can be made to have a low capacity or a small size. However, it is preferred that the running efficiency of the assist prime mover 5 is kept in a satisfactory state. In case the speed of the output member 2 rises according to the vehicle speed, for example, the gear ratio is lowered to decrease the speed of the assist prime mover 5. In case the speed of the output member 2 drops, on the other hand, the gear ratio may be raised.

Figure 11:
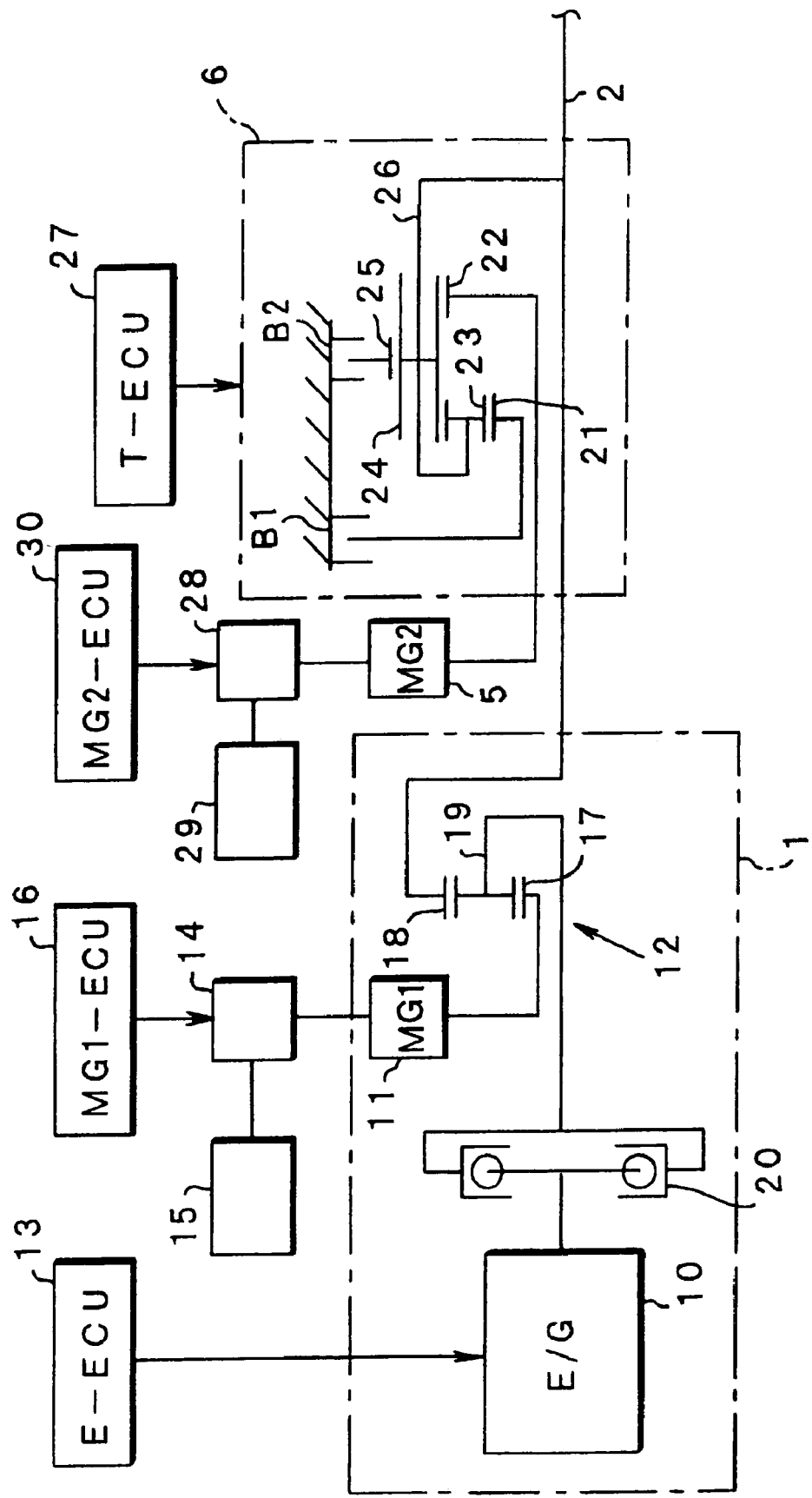
FIG. 11 is a skeleton diagram showing the hybrid drive unit more specifically.

The aforementioned hybrid drive unit will be described more specifically. As shown in FIG. 11, the main prime mover 1 is mainly constructed to include an internal combustion engine (as will be called the "engine") 10, a motor generator (as will be tentatively called the "first motor generator" or "MG 1") 11, and a planetary gear mechanism 12 for synthesizing or distributing the torque between those engine 10 and first motor generator 11. The engine 10 is a well-known power unit such as a gasoline engine or a Diesel engine for outputting a power by burning a fuel, and is so constructed that its running state such as the degree of throttle opening (or the air intake amount), the fuel feed amount or the ignition timing can be electrically controlled. This control is made by an electronic control unit (E-ECU) 13 composed mainly of a microcomputer, for example. On the other hand, the first motor generator 11 is exemplified by a synchronous electric motor and is constructed to function as an electric motor and a dynamo. The first motor generator 11 is connected through an inverter 14 with an accumulator device 15 such as a battery. By controlling the inverter 14, moreover, the output torque or the regenerative torque of the first motor generator 11 is suitably set. For this control, there is provided an electronic control unit (MG1-ECU) 16, which is composed mainly of a microcomputer.

Moreover, the planetary gear mechanism 12 is a well-known one for establishing a differential action with three rotary elements: a sun gear 17 or an external gear; a ring gear 18 or an internal gear arranged concentrically with the sun gear 17; and a carrier 19 holding a pinion gear meshing with those sun gear 17 and ring gear 18 such that the pinion gear may rotate on its axis and revolve around the carrier 19. The engine 10 has its output shaft connected through a damper 20 to that carrier 19 as a first rotary element. In other words, the carrier 19 acts as an input element.

On the other hand, the first motor generator 11 as a second rotary element is connected to the sun gear 17. Therefore, this sun gear 17 is the so-called "reaction element", and the ring gear 18 as a third rotary element is the output element. And, this ring gear 18 is connected to the output member (i.e., the output shaft) 2.

In the example shown in FIG. 11, on the other hand, the transmission 6 is constructed of one set of Ravignaux type planetary gear mechanisms. These planetary gear mechanisms are individually provided with external gears, i.e., a first sun gear 21 and a second sun gear, of which the first sun gear 21 meshes with a short pinion 23, which meshes with an axially longer long pinion 24, which meshes with a ring gear 25 arranged concentrically with the individual sun gears 21 and 22. Here, the individual pinions 23 and 24 are so held by a carrier 26 as to rotate on their axes and to revolve around the carrier 26. Moreover, the second sun gear 22 meshes with the long pinion 24. Thus, the first sun gear 21 and the ring gear 25 construct a mechanism corresponding to a double-pinion type planetary gear mechanism together with the individual pinions 23 and 24, and the second sun gear 22 and the ring gear 25 construct a mechanism corresponding to a single pinion type planetary gear mechanism together with the long pinion 24.

There are also provided a first brake B1 for fixing the first sun gear 21 selectively, and a second brake B2 for fixing the ring gear 25 selectively. These brakes B1 and B2 are the so-called "frictional engagement devices" for establishing engaging forces by frictional forces, and can adopt a multi-disc engagement device or a band type engagement device. The brakes B1 and B2 are constructed to change their torque capacities continuously according to the engaging forces of oil pressures or electromagnetic forces. Moreover, the aforementioned assist prime mover 5 is connected to the second sun gear 22, and the carrier 26 is connected to the output shaft 2.

In the transmission 6 thus far described, therefore, the second sun gear 22 is the so-called "input element", and the carrier 26 is the output element. The transmission 6 is constructed to set high gear stages of gear ratios higher than "1" by applying the first brake B1, and to set low gear stages of gear ratios higher than those of the high gear stages by applying the second brake B2 in place of the first brake B1. The shifting operations between those individual gear stages are executed on the basis of a running state such as a vehicle speed or a drive demand (or the degree of accelerator opening). More specifically, the shifting operations are controlled by predetermining gear stage regions as a map (or a shifting diagram) and by setting any of the gear stages according to the detected running state. For these controls, there is provided an electronic control unit (T-ECU) 27, which is composed mainly of a microcomputer.

Here in the example shown in FIG. 11, there is adopted as the assist prime mover 5 a motor generator (as will be tentatively called the "second motor generator" or "MG2"), which can have the power mode to output the torque and the regenerative mode to recover the energy. This second motor generator 5 is connected through an inverter 28 with a battery 29. Moreover, the motor generator 5 is constructed to control the power mode, the regenerative mode and the torques in the individual modes by controlling the inverter 28 with an electronic control unit (MG2-ECU) 30 composed mainly of a microcomputer. Here, the battery 29 and the electronic control unit 30 can also be integrated with the inverter 14 and the battery (the accumulator device) 15 for the aforementioned first motor generator 11.

Figure 12A:
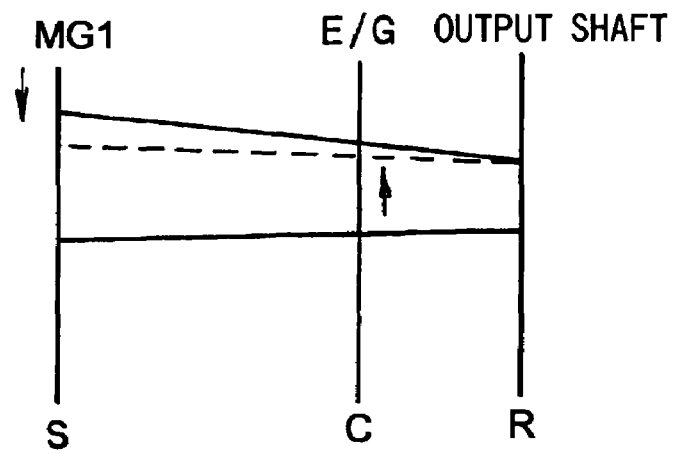
FIG. 12A is a nomographic diagram on a single pinion type planetary gear mechanism shown in FIG. 11.

A nomographic diagram of the single pinion type planetary gear mechanism 12 as the aforementioned torque synthesizing/distributing mechanism is present in FIG. 12A. When the reaction torque by the first motor generator 11 is inputted to the sun gear 17 against the torque to be inputted to the carrier 19 and outputted by the engine 10, a higher torque than that inputted from the engine 10 appears at the ring gear 18 acting as the output element. In this case, the first motor generator 11 functions as a dynamo. With the speed (or the output speed) of the ring gear 18 being constant, on the other hand, the speed of the engine 10 can be continuously (or without any step) changed by increasing/decreasing the speed of the first motor generator 11. Specifically, the control for setting the speed of the engine 10 at a value for the best fuel economy can be made by controlling the first motor generator 11. Here, the hybrid type of this kind is called the "mechanical distribution type" or "split type".

Figure 12B:
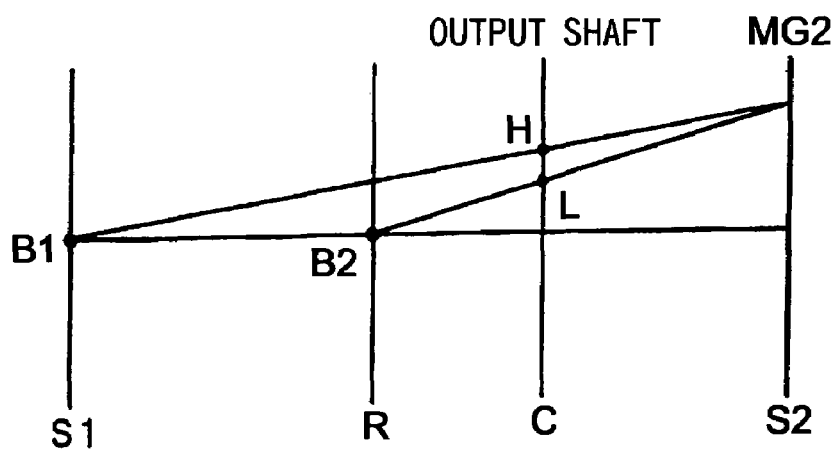
FIG. 12B is a nomographic diagram on a Ravignaux type planetary gear mechanism shown in FIG. 11.

On the other hand, a nomographic diagram of the Ravignaux type planetary gear mechanism constructing the transmission 6 is presented in FIG. 12B. When the ring gear 25 is fixed by the second brake B2, a low gear stage L is set so that the torque outputted from the second motor generator 5 is amplified according to the gear ratio and applied to the output shaft 2. When the first sun gear 21 is fixed by the first brake B1, on the other hand, there is set a high gear stage H having a lower gear ratio than that of the low gear stage L. The gear ratio at this high gear stage is higher than "1" so that the torque outputted by the second motor generator 5 is augmented according to that gear ratio and applied to the output shaft 2.

Here, in the state where the individual gear stages L and H are steadily set, the torque to be applied to the output shaft 2 is such one as is augmented from the output torque of the second motor generator 5 according to the gear ratio. In the shifting transitional state, however, the torque is such one as is influenced by the torque capacities at the individual brakes B1 and B2 and by the inertia torque accompanying the speed change. On the other hand, the torque to be applied to the output shaft 2 is positive in the drive state of the second motor generator 5 but negative in the driven state.

The hybrid drive unit thus far described has two prime movers such as the main prime mover 1 and the assist prime mover 5 so that the vehicle runs with low fuel consumption and low emission with utilizing those prime movers. The speed of the engine 10 is controlled by the first motor generator 11 for the optimum fuel consumption even when the engine 10 is driven. Moreover, an inertial energy belonging to the vehicle is regenerated as an electric power at the coasting time. When assisting the torque by driving the second motor generator 5, in a low vehicle speed state, the transmission 6 is set at the low gear stage L to increase the torque to be added to the output shaft 2. And in the state where the vehicle speed rises, the transmission 6 is set at the high gear stage H to lower the speed of the second motor generator 5 relatively so as to reduce the loss. As a result, the torque assist is executed efficiently.

Figure 13:
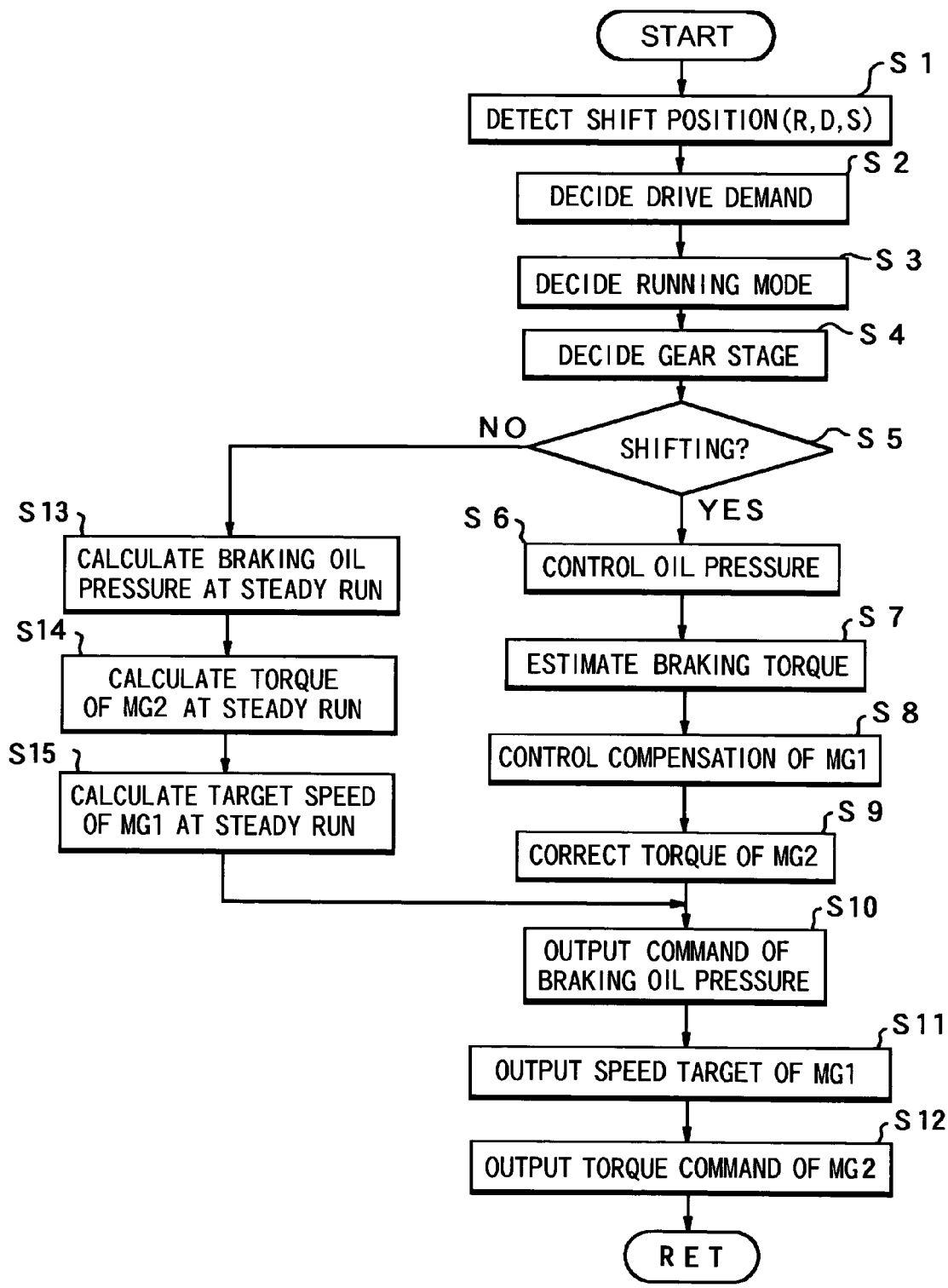
FIG. 13 is a schematic flow chart for explaining an overall control example by a hybrid drive unit, to which this invention is applied.

A basic example of the control of the aforementioned hybrid drive unit is shown in FIG. 13 as a flow chart. In the example shown in FIG. 13, first of all, the shift position is detected (at Step S1). This shift position is each of the states selected by the shift unit (although not shown), such as: a parking position P for keeping the vehicle in a stop state; a reverse position R for a backward run; a neutral position N for a neutral state; a drive position D for a forward run; an engine braking position S for either increasing the drive torque or raising the braking force at a coasting time by keeping the engine speed relatively higher than the speed of the output shaft 2. At Step S1, there are detected the individual shift positions for the reverse, drive and engine braking positions.

Next, the drive demand is decided (at Step S2). On the basis of the information on the running state of the vehicle such as the shift position, the accelerator opening or the vehicle speed, and the information stored in advance such as the driving force map for example, the drive demand is decided.

Moreover, the running mode is decided (at Step S3). The running mode means a running pattern (as will be called "EV running") in which the second motor generator 5 performs as the prime mover, and a running pattern (as will be called "engine running") in which the engine 10 performs as the main prime mover. This running mode is decided (i.e., selected) with taking: a charging amount (i.e., remaining charging amount) SOC of the aforementioned batteries 15 and 29; a temperature of each portion such as the batteries 15 and 29, and motor generators 5 and 11; and an operation state such as a failure of the hybrid drive unit as a whole; into consideration, in addition to the drive demand.

Moreover, the gear stage is decided (at Step S4) on the basis of the drive demand decided at the aforementioned Step S2. Specifically, the gear stage to be set at the aforementioned transmission 6 is decided to the low gear stage L or the high gear stage H.

It is judged (at Step S5) whether or not the shifting is in the course to the gear stage to be set by the transmission 6. This judgment is to judge whether or not the shifting is to be executed. The answer of Step S4 is YES, in case the gear stage decided at Step S4 is different from that set at that time.

In case the answer of Step S5 is YES, the oil pressure is controlled (at Step S6) to execute a shifting for setting the gear stage decided at Step S4. This oil pressure is that of the aforementioned individual brakes B1 and B2. The oil pressure makes such a low-pressure standby control for the brake on the applied side as keeps the brake under a predetermined low level after a fast-fill to raise the oil pressure primarily for restoring the state just before the application, and for the brake on the released side as steps down the oil pressure to a predetermined level and then lowers it to be gradually released according to the speed of the second motor generator 5.

By thus controlling the application pressures of the individual brakes B1 and B2, the torque to be transmitted between the second motor generator 5 and the output shaft 2 is limited so that the output torque drops in the power-on state. This drop of the torque accords to the torque capacities of the brakes B1 and B2 in the transmission 6 so that the braking torque is estimated (at Step S7). This estimation of the braking torque can be made on the basis of the oil pressure commands of the individual brakes B1 and B2.

The estimated braking torque corresponds to the reduction in the output torque so that a torque compensation control amount (or the target speed of the MG1) by the main prime mover 1 for compensating the reduction in the output torque is determined (at Step S8). In the hybrid drive unit shown in FIG. 11, the main prime mover 1 is constructed of the engine 10, the first motor generator 11 and the planetary gear mechanism 12 so that the torque at the shifting time can be compensated by controlling the torque of the first motor generator 11. At Step S8, therefore, the compensation control amount of the first motor generator 11 can be determined.

As described hereinbefore, the shifting operations of the transmission 6 are executed by changing the applied/released states of the individual brakes B1 and B2, and the output shaft torque may fall in the shifting operation. In this procedure, therefore, the output torque of the second motor generator 5 is temporarily raised to compensate the fall of the output shaft torque by the second motor generator 5. Therefore, the torque correction amount of the second motor generator 5 is determined (at Step S9) in addition to the calculation of the correction control amount of the first motor generator 11.

Next, the individual control amounts or correction amounts thus determined are outputted. Specifically, there are outputted: the command signal (at Step S10) for controlling the braking oil pressure determined at Step S6; a command signal (at Step S11) for setting the target speed of the MG1 determined at Step S8; and a command signal (at Step S12) for setting the torque of the second motor generator 5 determined at Step S9.

In case the answer of Step S5 is NO because of no shifting, on the other hand, the braking oil pressure at the steady running time (not at the shifting time) is calculated (at Step S13). The braking oil pressure is one for setting the torque capacity corresponding to the torque to be transmitted between the second motor generator 5 and the output shaft 2, so that it can be calculated on the basis of the torque demanded to be transmitted between the second motor generator 5 and the output shaft 2.

Moreover, there is calculated (at Step S14) the torque of the second motor generator 5 at the steady running time. At this steady running time, the engine 10 is controlled for the satisfactory fuel consumption, and the excessiveness and shortage of the output of the main prime mover 1 for the drive demand in that state is compensated by the second motor generator 5. Therefore, the torque of the second motor generator 5 can be calculated on the basis of the torque outputted by the engine 10 and the first motor generator 11, and the torque demanded.

As described above, the speed of the engine 10 can be controlled by the first motor generator 11, and the engine 10 is run in the steady running state for the optimum fuel consumption. As the speed of the first motor generator 11, therefore, the speed for the optimum fuel consumption of the engine 10 is calculated (at Step S15) for the target as the speed of the first motor generator 11.

After this, the routine advances to Step S10 to Step S12 thus far described. At these Steps, there are individually outputted: the command signal for setting the braking oil pressure, as determined at Step S13; the command signal for setting the torque of the second motor generator 5, as determined at Step S14; and the command signal for setting the speed of the first motor generator 11, as calculated at Step S15.

As described hereinbefore, the output shaft torque is compensated by the first motor generator 11 and the torque of the second motor generator 5 is corrected, at the shifting time in the transmission 6. For those controls of the torque, the aforementioned batteries 15 and 29 are charged with the electric power, or output the electric power. As seen from the aforementioned FIG. 12A, for example, the negative torque to be applied to the sun gear 17 is raised by raising a generation of the first motor generator 11 in order to compensate the fall of the output shaft torque. Therefore, the power charge is performed with accepting the electric power by the battery 15. Moreover, it is necessary for the torque of the second motor generator 5 to be raised in case of raising the speed of the second motor generator 5 to the synchronous speed. Therefore, the electric power is outputted from the battery 29.

Accordingly, there may be a case in which the running control of the first motor generator 11 and the second motor generator 5 is restricted according to the operation state of the batteries 15 and 29, i.e., the charging amount SOC and the temperatures of those. In other words, the control of the torque compensation and the torque correction at the shifting time may be restricted according to the condition of the batteries 15 and 29 which correspond to the energy accumulator. The control device of the present invention is constructed to execute such controls as will be describes hereinafter, in order to prevent the shocks as might otherwise accompany the gear shift from being deteriorated, even if the running control is restricted.

Figure 1:
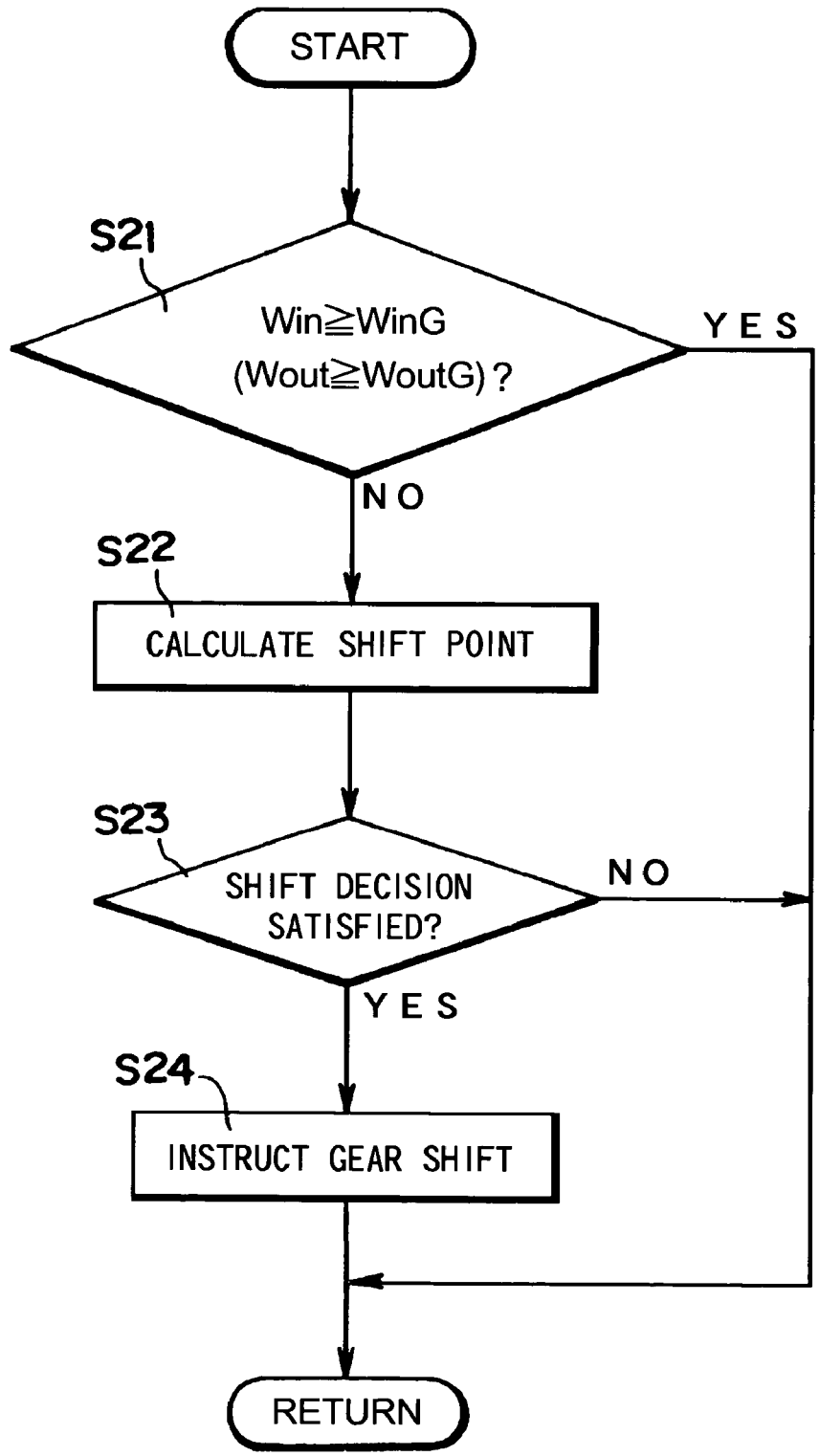
FIG. 1 is a schematic flow chart for explaining a control example by a control device of this invention.

FIG. 1 shows an example of the case in which the running control of the first motor generator 11 is restricted, and it is judged whether or not the amount of the electric power possible to be charged into the battery 15 from the first motor generator 11 to compensate the output shaft torque at the shifting time, i.e., an acceptance limiting value (or an acceptable electric power) Win is more than the predetermined value, i.e., an acceptance limiting guard value WinG (at Step S21).

In case the answer of Step S21 is YES, specifically, if the battery 15 can sufficiently accept the electric power generated by outputting the negative torque from the first motor generator 11, the normal running control at the shifting time is possible and the routine is therefore returned without any especial control. In case the answer of Step S21 is NO, on the contrary, the battery 15 cannot sufficiently accept the electric power generated by the first motor generator 11, and the first motor generator 11 cannot output the necessary negative torque to compensate the output shaft torque. Therefore, the shift point to decide the gear shift to be executed by the transmission 6 is changed (at Step S22). Specifically, the shift point is calculated. This calculation or change of the shift point is executed for individual acceptance limiting value Win.

Figure 2:
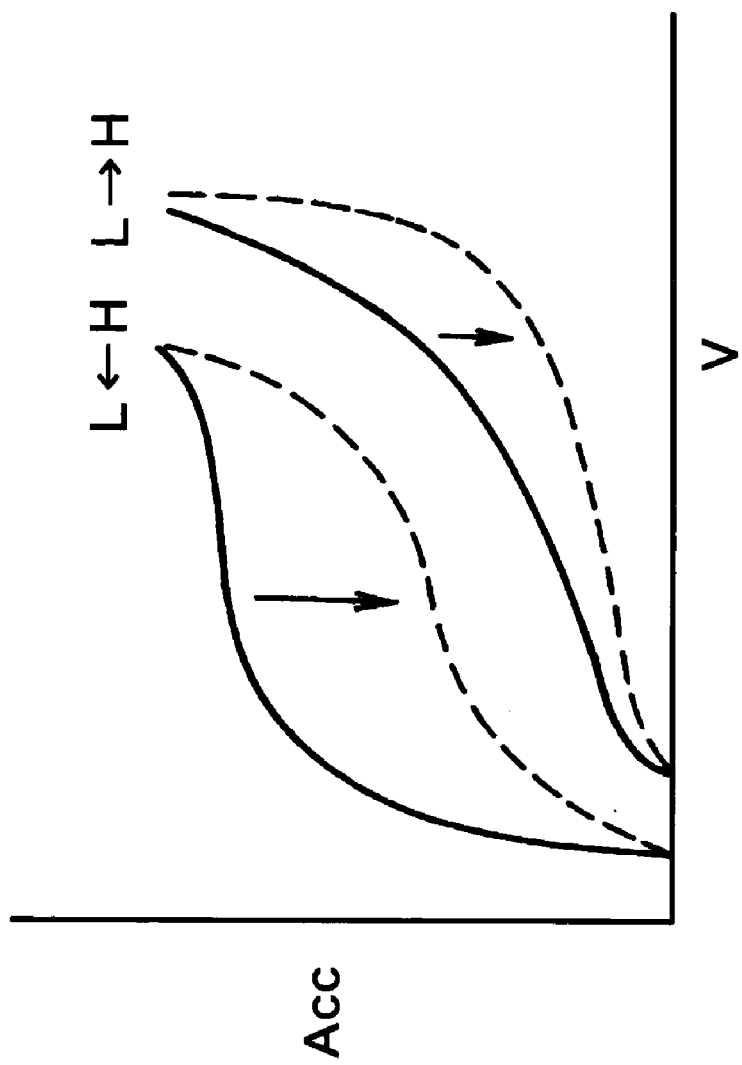
FIG. 2 is a diagram showing a shifting line changed to a low load side as compared to a normal shifting line schematically.

The control at the Step S22 changes the normal shift point as indicated by a solid line in FIG. 2 relatively to the low load side as indicated by broken lines. Here, FIG. 2 is a shifting diagram taking the vehicle speed V as its abscissa, and the load Acc represented by the opening of an accelerator etc. as its ordinate. A downshift line joining downshift points from the high gear stage H to the low gear stage L, and an upshift line joining upshift points from the low gear stage L to the high gear stage H are provided therein, and both of those shifting lines are to be changed. This change of shift point can be made by preparing a formula in which the load and the vehicle speed are used as variables, and by setting the shift point determined on the basis of the formula. Alternatively, this change of shift point can be made by preparing map values on behalf of the formula, and by setting the shift point with using the map values.

Next, the gear shift in the transmission 6 is decided on the basis of the load and the vehicle speed at that time, and the changed shift point (Step S23). In case the decision of the gear shift is not satisfied, the answer of Step S23 is NO, and the routine is returned without any especial control. In case of the answer of Step S23 is YES because of satisfaction of the decision of the gear shift, on the contrary, an instruction of gear shift is outputted (at Step S24). Here, for example, the decision of the gear shift is satisfied in case the running state which is determined on the basis of the vehicle speed V and the load Acc intersect either of the aforementioned upshift line or the downshift line.

As mentioned above, this shifting operation is executed by releasing any of the first brake B1 and the second brake B2 whereas engaging the other brake. The torque to be outputted from the main prime mover 1 to the output shaft 2 is temporarily raised by controlling the first motor generator 1, in order to suppress or avoid the fall of the output shaft torque during the shifting operation. In this case, as the answer of the aforementioned Step S21 is YES, the acceptance limiting value Win is smaller than the guard value WinG so that the running control of the first motor generator 11 is restricted. As a result, the torque to compensate the fall of the output shaft torque becomes small or zero.

However, the shift point is changed to the low load side and the shifting operation is being executed in the low load state so that the fall of the output shaft torque as might otherwise accompany the gear shift is small, and the fall of the output shaft torque can be avoided or reduced by the small compensating torque. Therefore, the fall or fluctuation of the output shaft torque becomes small in case the shifting operation is executed in the transmission 6 by outputting the instruction of the gear shift at Step S24, and the shocks are thereby avoided or suppressed. Moreover, the torque acting on the individual brakes B1 and B2, or the energy amount to be absorbed by those brakes B1 and B2, fall relatively. Therefore, the duration of those breaks B1 and B2 is improved.

Figure 3:
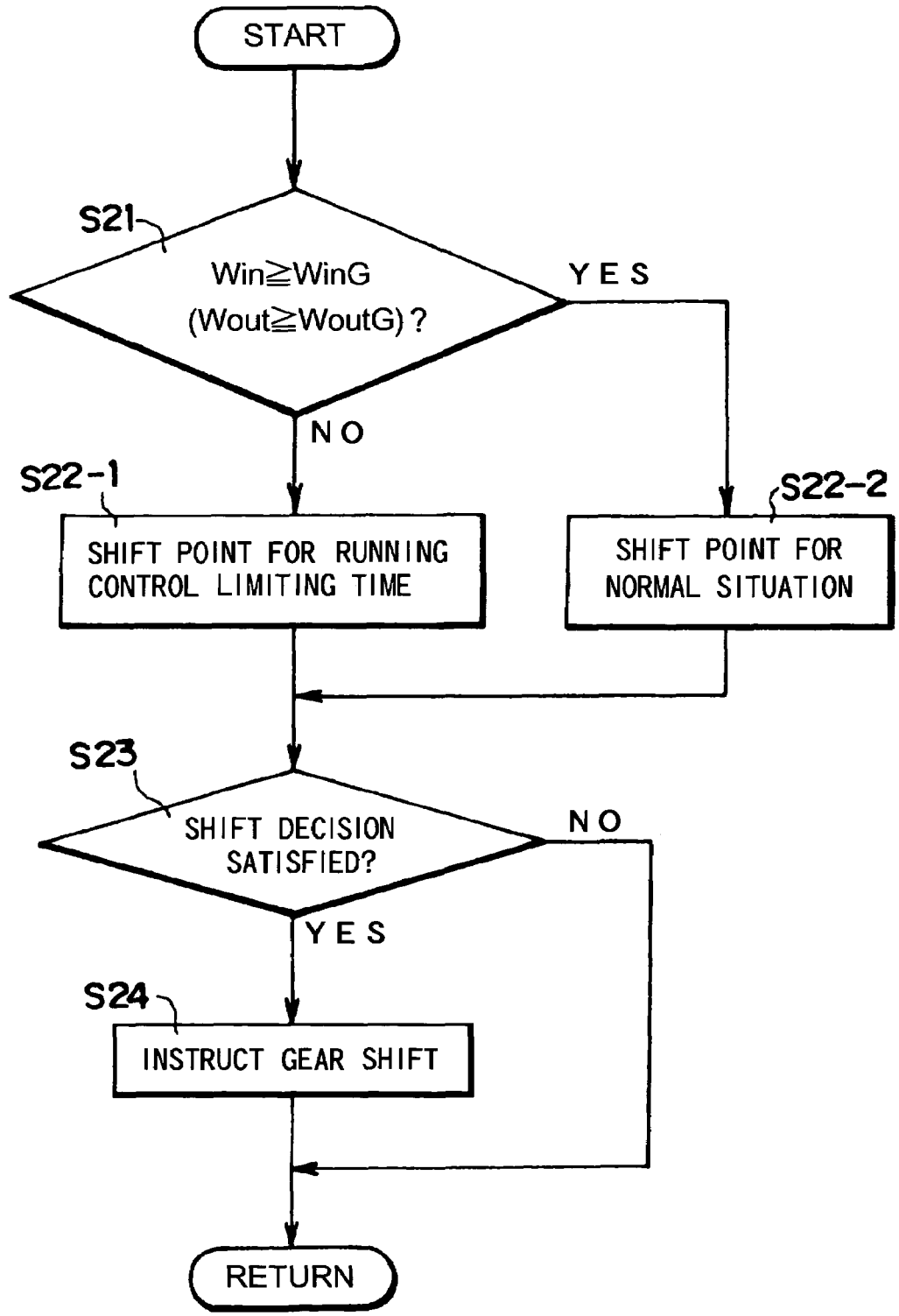
FIG. 3 is a schematic flow chart for explaining another control example by the control device of this invention.

Here, the aforementioned example is constructed such that the shift point is changed continuously, or changed in the plural patterns by the map values. However, the construction may be modified to select the shift points for the normal situation, or for the running control limiting time. The example is shown in FIG. 3. Specifically, in case the answer of Step S21 is NO because the acceptance limiting value Win of the battery 15 is smaller than the guard value WinG, the shift point for the running control limiting time is selected (at Step S22-1). On the other hand, in case the answer of Step S21 is YES because the acceptance limiting value Win is greater than the guard value WinG, the shift point for the normal situation is selected (at Step S22-2). Here, for example, the shift point for the normal situation is the shift point indicated by the solid line in FIG. 2. On the other hand, the shift point for running control limiting time is the shift point indicated by the broken line in FIG. 2. and it is changed relatively to the low load side in comparison with the shift point for the normal situation.

Moreover, the change of the shift point according to the present invention is, in short, sufficient if the timing of the gear shift is changed. Therefore, the construction may be modified such that the gear shift is decided on the basis of the value which is determined by applying the predetermined correction to the detected parameters such as the load and the vehicle speed as a factor of decision of the gear shift, without changing the shift point to be set on the shifting diagram.

Here, in the hybrid drive unit having a construction shown in FIG. 11, in case the gear stage is shifted from the low gear stage L to the high gear stage H in the transmission 6, the second motor generator 5 is so power-controlled that the fall of the output shaft torque may be suppressed during the shifting operation. In this case, it is necessary to output the electric power from the battery 29 to the second motor generator 5. However, in case the charging amount SOC of the battery 29 drops, or in case the electric power cannot be outputted sufficiently due to the low temperature, the second motor generator 5 cannot be sufficiently power-controlled. In the control device according to this invention, therefore, the shift point is relatively changed to the low load side in case the power control is restricted in accordance with the condition of the battery 29.

Specifically, in case an electric power output limiting value (i.e., a possible electric energy to be outputted from the battery 29) of the battery 29 Wout is smaller than the predetermined value, the shift point is changed by determining the upshift point and the downshift point on the basis of the predetermined calculation or the map values, alternatively, by selecting the shift point for the running control limiting time set in advance. For judging the restriction on the running control on the basis of the electric power output limiting value Wout, the predetermined electric power output limiting value WoutG and the electric power output limiting value Wout at that point of time are to be compared. In case the electric power output limiting value Wout is greater than the guard value WoutG, it is possible to output the electric power sufficiently so that the normal shift point is employed. In case the electric power output limiting value Wout is smaller than the guard value WinG, on the contrary, it is not possible to output the electric power sufficiently so that the normal shift point for the running control limiting time is to be set. Those changing control are identical to that of the control examples shown in FIG. 1 and FIG. 3.

Therefore, since the control to change the shift point in accordance with the restriction of the output of the electric power from the battery 29 is generally identical to the control to change the shift point relatively to the low load side in accordance with the aforementioned acceptance limiting value Win, the comparison between the electric power output limiting value Wout and its guard value WoutG are included in the Step S21 of FIG. 1 and FIG. 3.

In case the running control to thus execute the power control on the second motor generator 5 at the shifting time is restricted on the basis of the condition of the battery 29, the gear shift in the transmission 6 is executed in relatively low load state. Therefore, the fall of the output shaft torque itself in the transient state of the shifting operation is small so that the shift shock is relaxed. In addition, the torque possible to be outputted from the second motor generator 5 acts effectively to suppress the fall of the output shaft even if it is small. Therefore, the shift shock is suppressed or prevented also in this respect.

In case the compensation of the output shaft torque or correction of the torque by any of the motor generators 11 and 5 is restricted at the shifting time in the transmission 6, as described above, the fall of the output shaft torque becomes large and the shocks subject to deteriorate if the gear shift is executed as usual. In order to avoid this kind of disadvantage, it is possible to control as will be described hereinafter, instead of the aforementioned change of the shift point.

Figure 4:
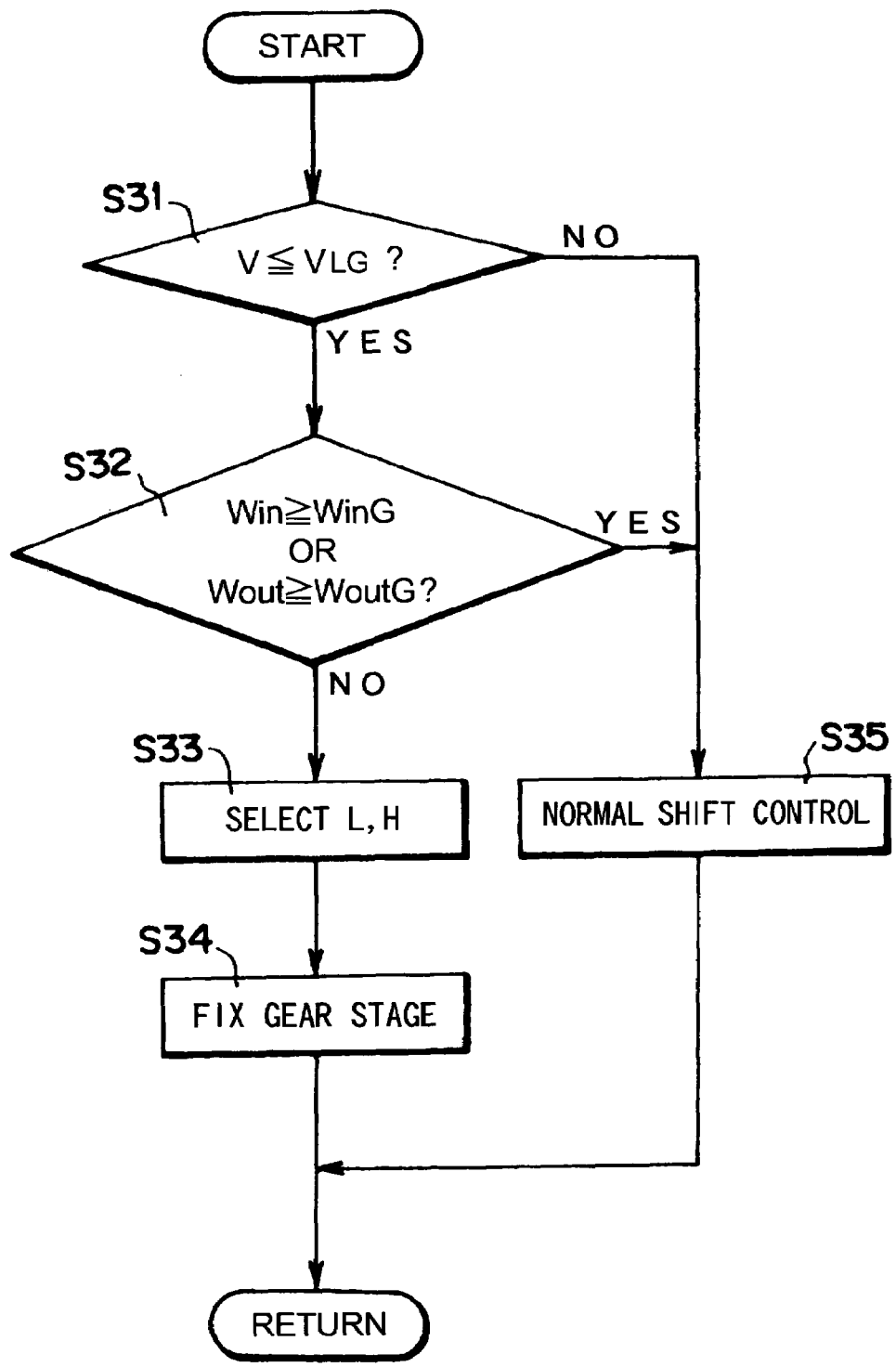
FIG. 4 is a schematic flow chart for explaining still another control example by the control device of this invention.

FIG. 4 is a simplified flowchart showing an example of that control. First of all, it is judged whether or not a vehicle speed V is lower than an upper limit vehicle speed VLG of a low gear stage (L mode) L (at Step S31). The upper limit vehicle speed VLG is the predetermined vehicle speed to avoid an overrun etc. of the engine 10 or individual motor generators 11 and 5.

In case the answer of Step S31 is YES, it is judged whether or not the aforementioned acceptance limiting value Win is greater than its guard value WinG, or it is judged whether or not the output limiting value Wout is greater than its guard value WinG (at Step S32). In case any of the acceptance limiting value Win and the output limiting value Wout is smaller than its guard values WinG and WoutG, the answer of Step S32 is NO. In this case, any of the high gear stage H and the low gear stage L is selected (at Step S33).

This selection of the gear stage at Step S33 is executed on the basis of the running state of the vehicle having the aforementioned hybrid drive unit at that point of time. For example, the low gear stage L is selected in case the vehicle speed is low and a high torque is needed. In case the high torque is not needed but it is necessary to raise an oil temperature immediately etc., on the contrary, the high gear stage H is selected. This selection of the gear stage may be operated manually by a driver, or may be executed automatically by the control device.

This selected gear stage is fixed (at Step S34). Specifically, the gear stage at the start is kept even if the change in the running state such as the load and the vehicle speed occurs. As a result, the gear shift is not caused in the transmission 6 in the state where there is no compensation for the output shaft torque and torque correction by the second motor generator 5. Therefore, the shocks do not deteriorate.

In case the answer of Step S31 is NO, on the other hand, a normal shift control is executed (at Step S35). This normal shift control executes the gear shift by deciding the gear shift on the basis of the predetermined shift point, in the state where the running control on the aforementioned individual motor generators 11 and 5 is not restricted. Therefore, the normal shift control is also executed in case the answer of the aforementioned Step S 32 is YES, specifically, in case both of the acceptance limiting value Win and the output limiting value Wout are greater than respective guard values WinG and WoutG.

Here, the control to fix the gear stage (gear ratio) may be executed to promote a warm up of the hybrid drive unit. An example is shown in a flowchart in FIG. 5. First of all, it is judged whether or not a temperature (e.g., an oil temperature) THo of the hybrid drive unit is lower than the predetermined reference value THoG (at Step S41). In case the answer of Step S41 is YES, a motive power loss is large or a controllability of the oil pressure is lowered, because the temperature of the hybrid drive unit is low and a viscosity of the oil is high. In this case, therefore, the transmission 6 is set and fixed-to a warm up promotion mode (gear stage) (at Step S42). This warm up promotion mode is identical to the gear stage selected at the aforementioned Step S33 shown in FIG. 4, and is the high gear stage H or the low gear stage L selected on the basis of the running condition at that point of time. On the other hand, in case the answer of Step S41 is NO because the oil temperature THo is higher than the reference value THoG, the normal shift control is executed (at Step S43).

Figure 5:
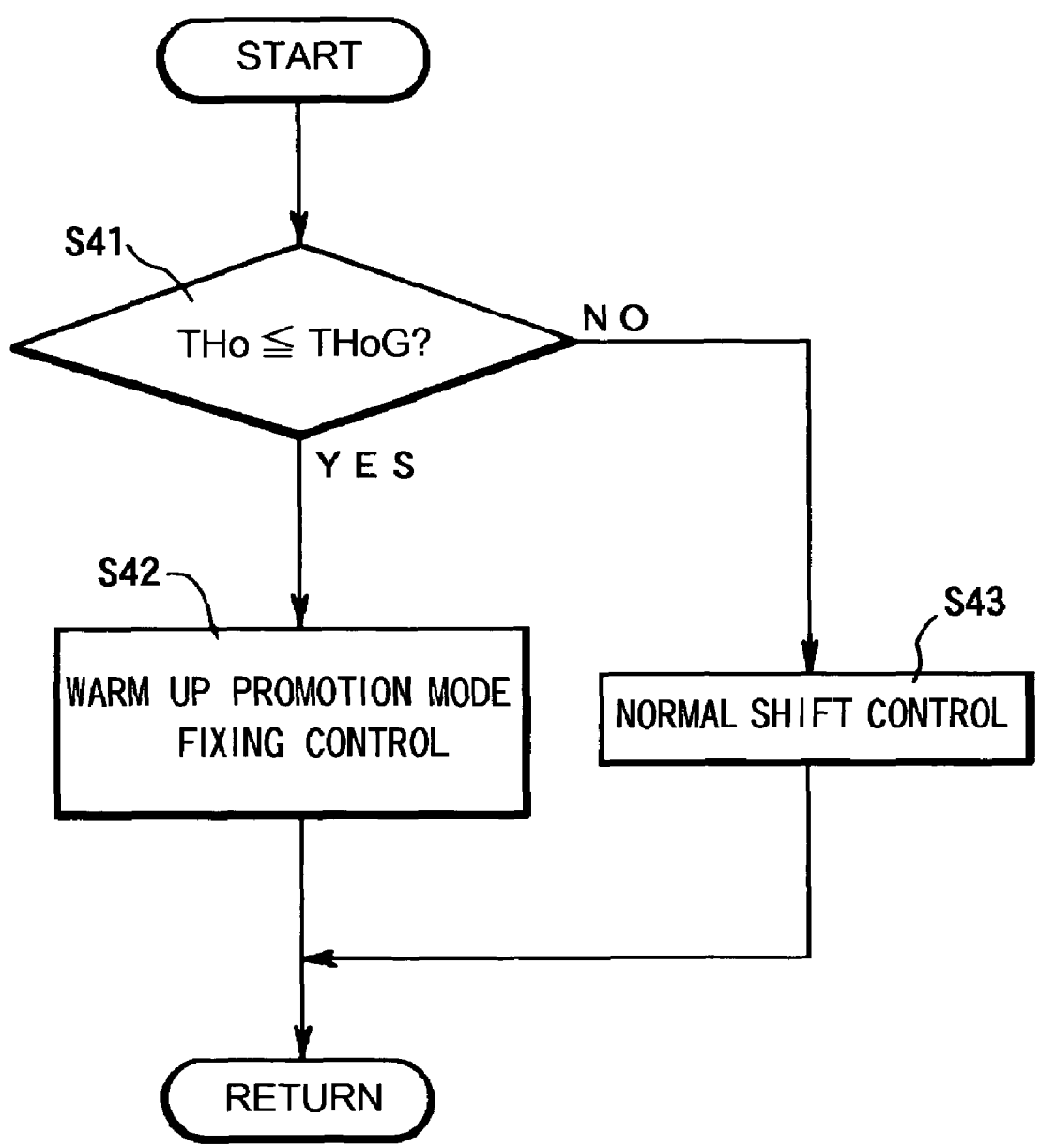
FIG. 5 is a schematic flow chart for explaining a control example in which a fixing control of the gear ratio and a normal shift control is selected on the basis of an oil temperature.

According to the control shown in FIG. 5, therefore, the gear shift in the bad condition of the controllability of the oil pressure is avoided and the deterioration of the shocks are thereby prevented. Moreover, the oil temperature rises quickly in the hybrid drive unit so that the viscosity of the oil is lowered. As a result, the motive power loss as might otherwise accompany the agitation of the oil is lowered and the fuel consumption can be improved.

In order to suppress the shocks as might otherwise accompany the gear shift in the state where the running control of any of aforementioned motor generators 11 and 5 is restricted, it is also effective to change the shift point to the low speed side, instead of aforementioned changing of the shift point to the low load side, or fixing of the gear ratio. The example is shown in a flowchart in FIG. 6.

Figure 6:
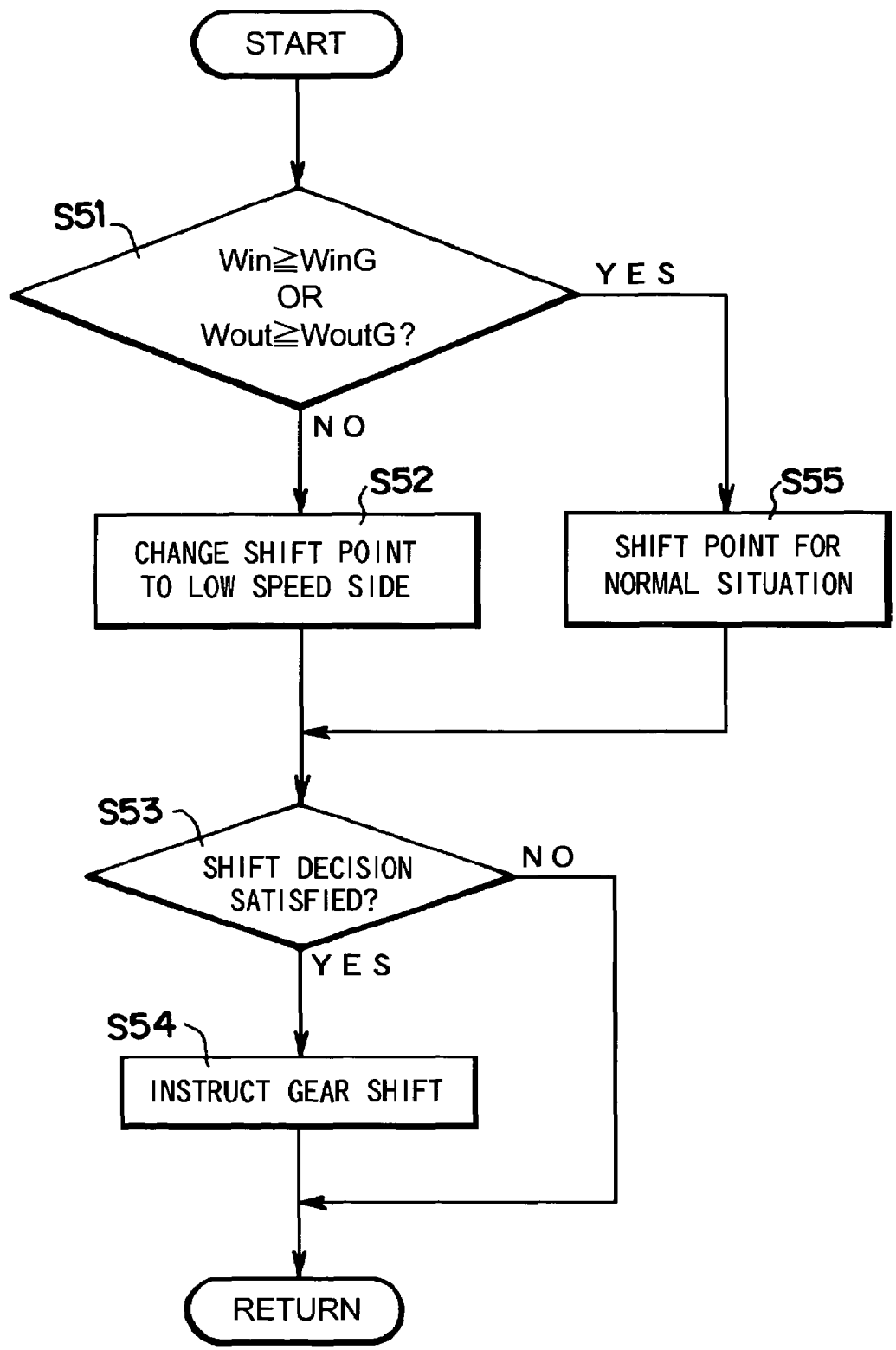
FIG. 6 is a schematic flow chart for explaining a control example by the control device of this invention constructed to change a shift point to a low speed side.
Figure 7:
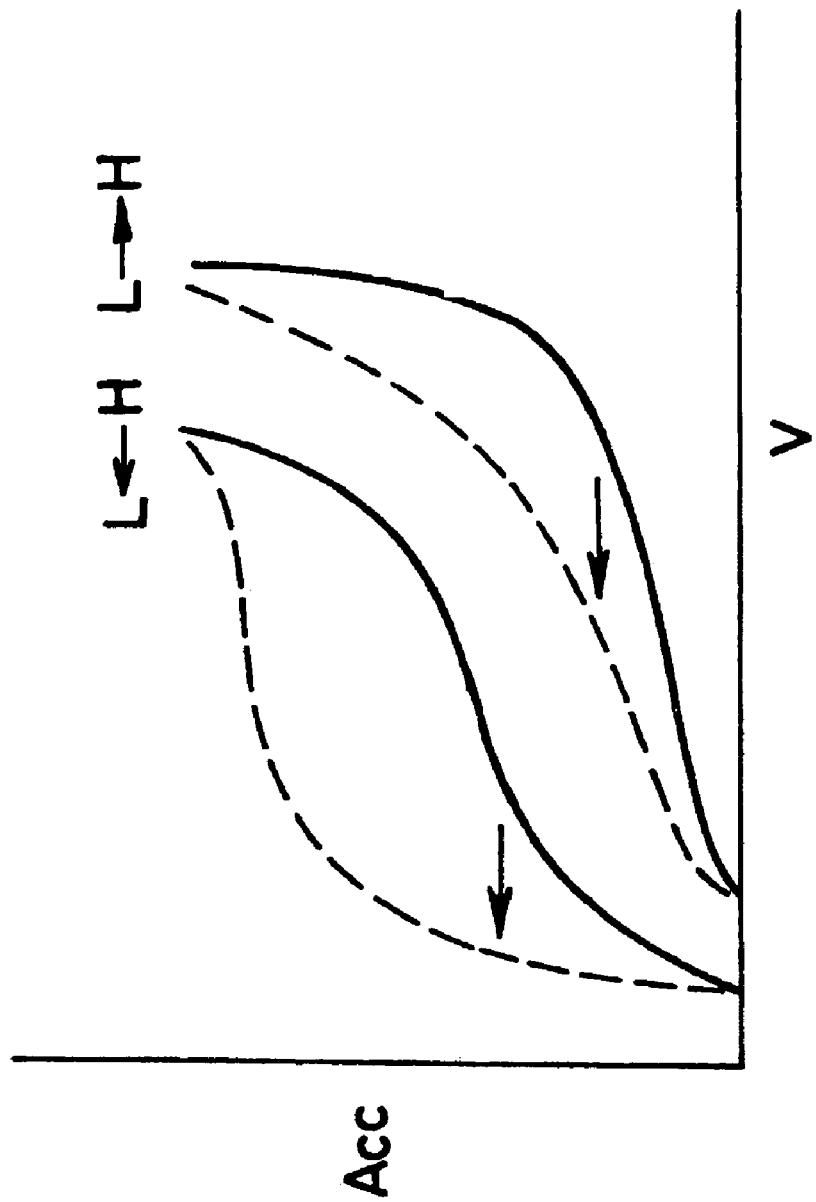
FIG. 7 is a diagram showing a shifting line changed to a low speed side as compared to a normal shifting line schematically.

In the control example shown in FIG. 6, first of all, it is judged whether or not the aforementioned acceptance limiting value Win is higher than its guard value WinG, or the output limiting value Wout is higher than its guard value WoutG (at Step S51). In case any of the acceptance limiting value Win and the output limiting value Wout is smaller than its guard values WinG and WoutG, the answer of Step S51 is NO. In this case, the shift point to decide the gear shift in the transmission 6 is relatively changed to the low speed side in comparison with the shift point in which the gear shift is decided in the normal situation (at Step S52). The example is schematically shown in a shifting diagram in FIG. 7.

This change in the shift point is executed for each of the acceptance limiting value Win and output limiting value Wout. Moreover, a new shift point is determined on the basis of the formula or the map set in advance. Alternatively, the change in the shift point is executed by selecting the shift point for the running control limiting time set in advance. Specifically, the procedure to change the shift point is identical to the aforementioned case in which the shift point is changed to the low load side.

Next, the gear shift in the transmission 6 is judged on the basis of the load and the vehicle speed at that point of time, and the changed shift point (at Step S53). In case the decision of the gear shift is not satisfied, the answer of Step S53 is NO, and the routine is returned in this case without any especial control. In case the answer of Step S53 is YES because of the satisfaction of the decision of the gear shift, on the contrary, the instruction of gear shift is outputted (at Step S54). Here, in case the answer of Step S51 is YES, the shift point for the normal situation is set (at Step S55).

As mentioned above, the shifting operation is executed by releasing any of the first brake B1 and the second brake B2 whereas engaging the other brake. And the torque to be outputted from the main prime mover 1 to the output shaft 2 is temporarily raised by controlling the first motor generator 11, in order to suppress or avoid the fall of the output shaft torque during the shifting operation. Alternatively, the output torque of the second motor generator 5 is raised.

In this case, as the answer of Step S51 is YES, the acceptance limiting value Win or the output limiting value Wout is smaller than their guard values WinG and WoutG, and the running controls of any of the motor generators 11 and 5 is restricted. As a result, the torque to compensate the fall of the output shaft torque, or the torque correction of the second motor generator 5 becomes small or zero.

However, the shift point is changed to the low speed side and the time period necessary for the gear shift is shortened, so that the shocks as might otherwise accompany the gear shift is prevented or relaxed in both shifting operation for upshift and downshift. Specifically, a time chart in case of shifting from the low gear stage L to the high gear stage H is shown schematically in FIG. 8. A substantial shifting operation is started at a point of time t1, and the output shaft torque or the torque acting on the transmission 6 to the output shaft 2 is lowered. The torque phase continues to the time point t2, and the inertia phase starts at the time point t2. Therefore, the speed of the second motor generator 5 starts decreasing and the accompanying inertia torque appears on the output shaft 2 thereby to increase the output shaft torque gradually. Moreover, the apply pressure (oil pressure) of the first brake B1 to set the high gear stage H also increases.

The change in the speed till the speed of the second motor generator 5 reaches the synchronous speed after the gear shift, i.e., the difference in the speed between before and after the gear shift is small, due to the fact that the shift point is changed to the low speed side. Therefore, the speed reaches the synchronous speed at the time point t3, and the shifting operation is ended. In case the normal shifting operation in which the shift point is not changed to the low speed side, on the other hand, the difference in the speed of the second motor generator 5 before and after the gear shift is big. Therefore, the speed reaches the synchronous speed at the far later time point t4 than the time point t3 and the shifting operation is ended.

Figure 8:
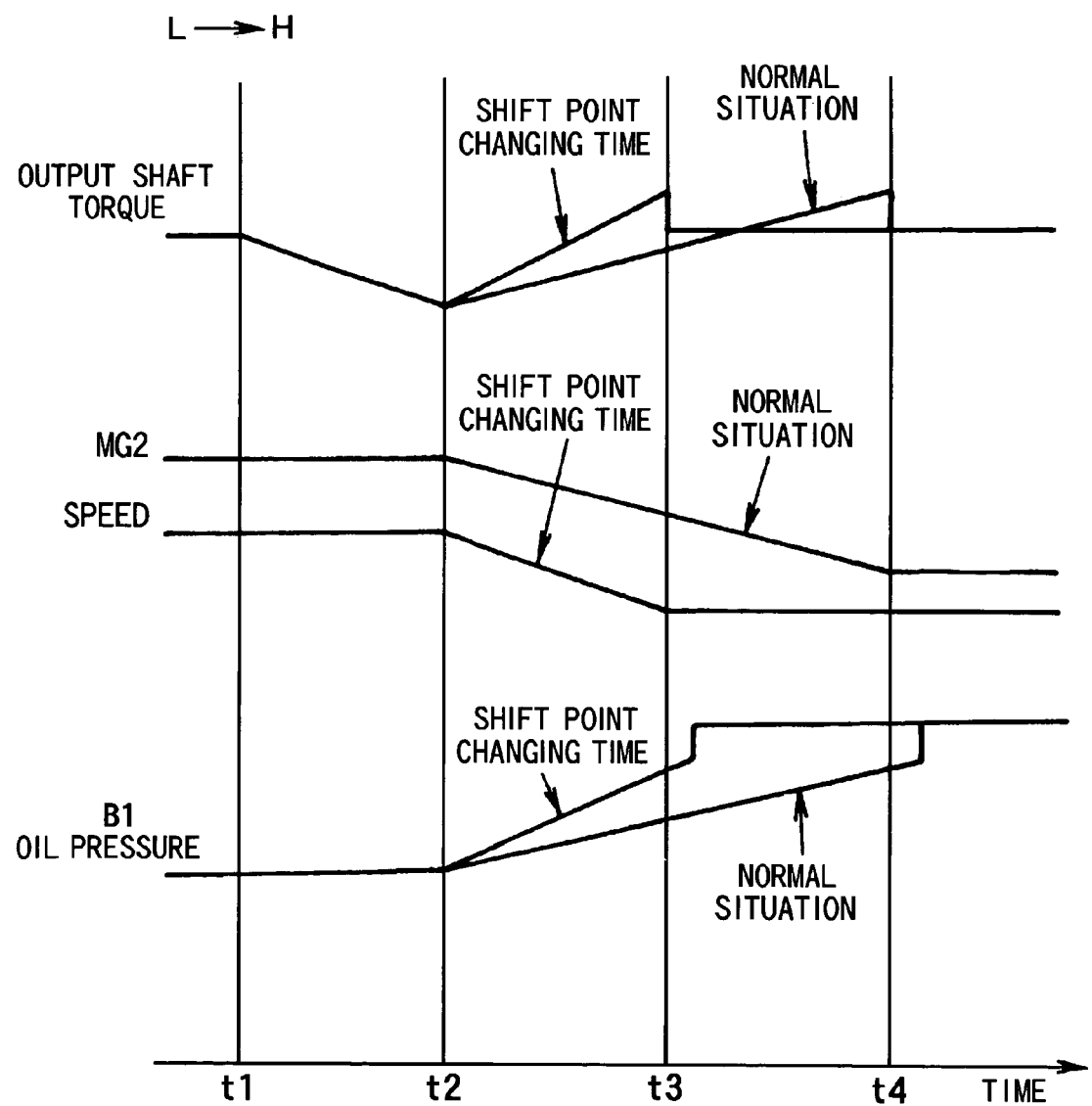
FIG. 8 is a time chart for explaining that a shifting time is shortened by changing a shift point to the low speed side.

In case the shift point is set in the low speed side, it is possible to relatively increase a rising gradient of the apply pressure of the brake B1 to set the high gear stage after the gear shift, as shown in FIG. 8. As a result, the time period necessary for the gear shift is shortened. Therefore, the fall in the output shaft torque during the gear shift becomes small thereby to suppress or prevent the torque fluctuation, i.e., the shocks during the gear shift. Moreover, the energy amount to be absorbed by the frictional engagement device to participate in the gear shift, i.e., the brake B1 becomes small so that the durability on its own is improved.

Here, the difference in the speed between before and after the gear shift is small without especially increasing the rising gradient of the apply pressure, and the shifting time is therefore short. However, in addition to this, in case the rising gradient of the apply pressure is not especially increased, an overshoot of the output shaft torque at the shift ending point of time is small. In this respect, too, the shock as might otherwise accompany the gear shift can be suppressed or prevented.

Next, the shift control for so-called "EV (Electric Vehicle) running" in which the vehicle runs with using the second motor generator 5 as the prime mover for running will be described hereinafter. As described above, the hybrid drive unit constructed as shown in FIG. 11 comprises the second motor generator 5 connected through the transmission 6 to the output shaft 2, so that the torque outputted from the second motor generator 5 can be transmitted to the output shaft 2 with being amplified by the transmission 6. Therefore, it is possible for the vehicle to run with using only the second motor generator 5 as a prime mover. This kind of running mode is the EV running (electric vehicle running) mode. In this case, the transmission torque between the second motor generator 5 and the output shaft 2 falls when the gear shift is executed in the transmission 6. Moreover, the output shaft torque cannot be compensated by the torque from the main prime mover 1 side, if the engine 10 is not driven. Therefore, the shifting operation in the EV running mode is controlled as will be described hereinafter.

Figure 9:
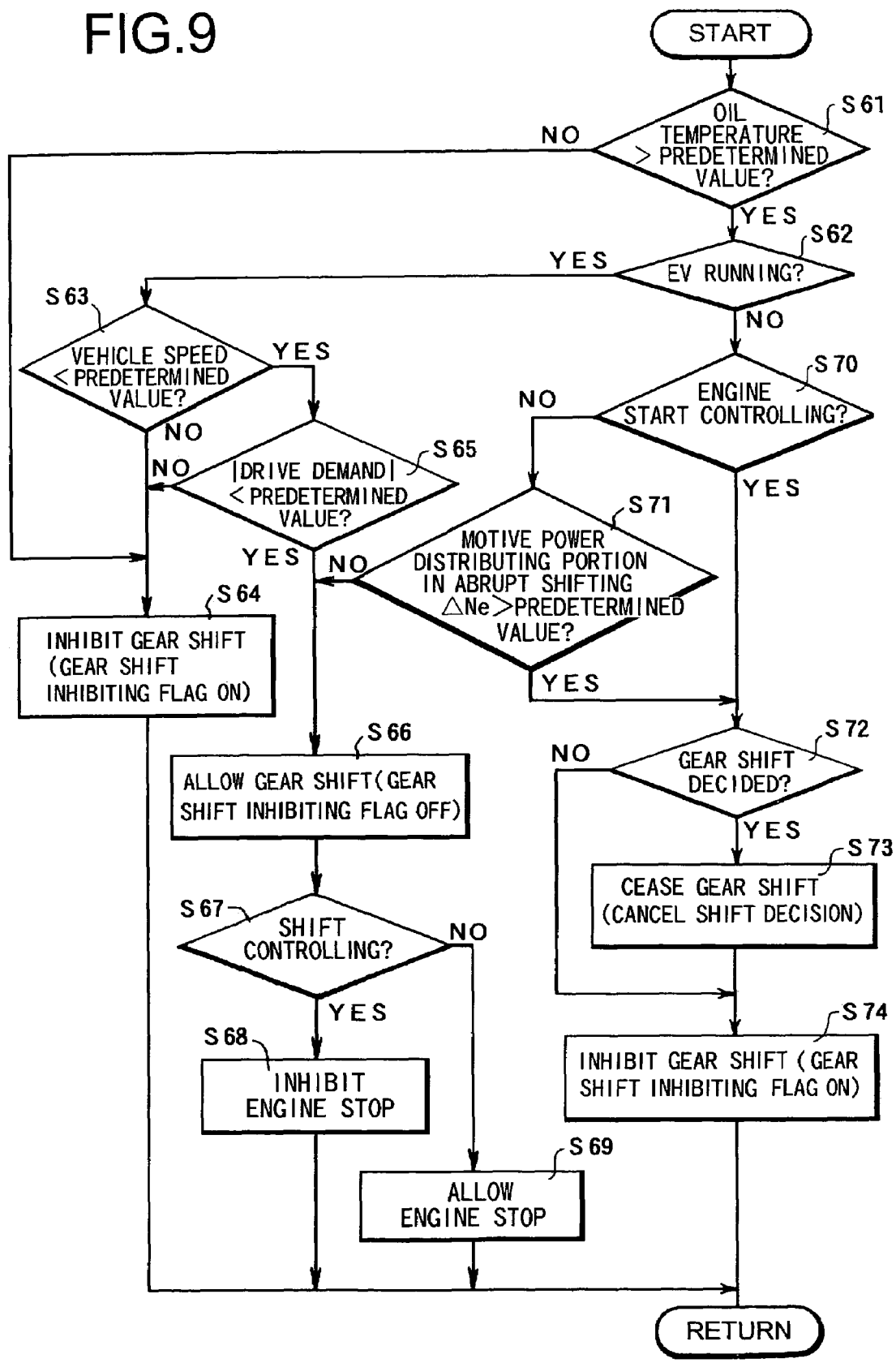
FIG. 9 is a flow chart for explaining a control example by the control device of this invention constructed to inhibit the gear shift at EV running time.

FIG. 9 is a flowchart for explaining an example of that control. First of all, it is judged whether or not the oil temperature in the hybrid drive unit is higher than the predetermined value set in advance (at Step S61). This judgment is to judge whether or not the warm up of the hybrid drive unit is completed and possible to execute the gear shift in the transmission 6 as envisioned. Therefore, if the answer of Step S61 is YES, it is judged whether or not the vehicle is in the EV running (at Step S62).

Here, "in the EV running" means the state where the vehicle is run by the motive energy outputted from the second motor generator 5, whereas the engine 10 is not under a starting control and a halting control. In case the answer of Step S62 is YES because the vehicle is in the EV running mode, it is judged whether or not the vehicle speed is lower than the predetermined speed (at Step S63). In case the answer of Step S63 is YES, the shifting operation is inhibited (at Step S64). Specifically, a gear shift inhibiting flag is turned ON.

EV running is the running mode in which the vehicle is run by the motive energy of the second motor generator 5. Therefore, when the gear shift is made in the transmission 6 which connects the second motor generator 5 and the output shaft 2, the torque cannot be transmitted from the second motor generator 5 to the output shaft 2 so that the variation in the output shaft torque, i.e., the shift shock is increased. Therefore, the shifting operation is inhibited in order to avoid this kind of situation. Specifically, the factor of the shocks itself will not be generated.

In case the answer of Step S63 is YES because the vehicle speed is lower than the predetermined speed, on the other hand, it is judged whether or not an absolute value of drive demand is smaller than the predetermined demand set in advance (Step S65). Specifically, it is judged whether or not an acceleration demand or a regenerative braking force at the coasting state is smaller than the predetermined value. In case the answer of Step S65 is NO, the second motor generator 5 is demanded to output the larger torque, or to generate the bigger regenerative braking force. In this case, therefore, a connection state of the second motor generator 5 and the output shaft 2 is kept so as to have the second motor generator 5 perform demanded driving and braking function even if the vehicle speed is low. Specifically, the shifting operation is prohibited (at Step S64).

On the contrary, in case the answer of Step S65 is YES, in other words, in case the vehicle speed is low and the positive or negative drive demand is smaller than the predetermined value, the shifting operation is allowed (at Step S66). Specifically, the gear shift inhibiting flag is turned OFF. It is because the variation in the output shaft torque as might otherwise accompany the gear shift in the transmission 6 and the accompanying shocks are small.

Then, it is judged whether or not the shifting control in the transmission 6 is substantially executed (at Step S67). In case the answer of step S67 is YES because of the shifting control, the halting of the engine 10 is inhibited (at Step S68). Specifically, the engine 10 is kept in the driving state so as to avoid the fluctuation of the output shaft torque at the shifting time. Therefore, in case the answer of step S67 is NO because of no shifting control, the halting of the engine 10 is allowed (at Step S69).

Here, in case the answer of step S61 is NO because of the low oil temperature, the routine is advanced to Step S64 and the shifting operation is inhibited.

Moreover, in case the answer of step S62 is NO because the vehicle is not in the EV running, the normal control is executed. Specifically, it is judged whether or not the engine 10 is under the starting control first of all (Step S70). In case the answer of step S70 is NO, it is judged whether or not an abrupt shifting is occurred in the planetary gear mechanism 12 which synthesizes or distributes the motive energy between the engine 10 and the first motor generator 11 (at Step S71). This can be judged by, for example, whether or not the variation ΔNe in the speed of the engine 10 exceeds the predetermined value.

In case the answer of step S71 is NO because of the mild change in the speed, the routine advances to the aforementioned Step S66 and the shifting operation is allowed. In case the answer of step S71 is YES, because of the rapid change in the speed, or because the engine 10 is under the starting control, on the contrary, it is judged whether or not the decision of the gear shift is satisfied, specifically, an existence of the decision of the gear shift is judged (at Step S72).

In case the answer of step S72 is YES because the decision of the gear shift is already made, the decision of the gear shift is canceled and the shifting operation is ceased (at Step S73). After this, the shifting operation is inhibited (at Step S74). In case the answer of step S72 is NO because of no decision of the gear shift, moreover, the routine instantly advances to Step S74 and the shifting operation is inhibited.

With this construction for executing the control shown in FIG. 9, the gear shift is not caused during the EV running, so that the shocks are prevented in advance. Moreover, the fluctuation of the output shaft torque at the shifting transitional time may be suppressed by controlling the torque of the engine 10 or the first motor generator 11 at the shifting time in the transmission 6. This is the control of aforementioned Steps S8, S9, S11 and S12, as shown in FIG. 13.

Here will be briefly described the relations between the aforementioned specific example and this invention. The device for executing aforementioned Steps S21, S31 and S51 corresponds to a running restriction judging means or judger of this invention; device for executing Steps S22, S22-1 and S52 corresponds to a shift point changing means or changer of this invention; the batteries 15 and 29 shown in FIG. 11 corresponds to an energy accumulator of this invention; the first motor generator 11 corresponds to a regenerating mechanism of this invention; and the device for executing Step S8 shown in FIG. 13 corresponds to an output torque correcting means or corrector and a shifting time torque correcting means or corrector of this invention. Moreover, the second motor generator 5 corresponds to a drive mechanism of this invention; the device for executing Step S9 shown in FIG. 13 corresponds to a drive controlling means or controller of this invention; the device for executing Step S34, corresponds to a gear ratio fixing means or device of this invention; and the device for executing Step S64 corresponds to a gear shift regulating means or regulator of this invention.

Here, this invention should not be limited to the aforementioned specific examples. The hybrid drive unit, to which this invention is applied is properly exemplified by the so-called "mechanical distribution type hybrid drive unit", in which the torque of the internal combustion engine and the torque of the first motor generator (or the electric motor) are transmitted to the output member through a synthesis distribution mechanism composed mainly of the planetary gear mechanism, as shown in FIG. 11, and in which the torque of the second motor generator (or the electric motor) is transmitted to that output member through the transmission. However, the hybrid drive unit of the invention may have another construction. In short, a required condition is that the second prime mover is connected through the transmission to the output member. Moreover, concerning the energy accumulator of the invention, in short, it is sufficient to charge a running inertial energy of the vehicle. Accordingly, a capacitor, a flywheel and so on, which can charge the energy regardless of the form of the energy, may be used other than the battery. Therefore, the regenerating mechanism is not limited to the motor generator. And the transmission of the invention may be a multiple-stage type transmission or a continuously variable transmission, other than the transmission having the construction to shift the gear stage high and low.

Here will be synthetically described the advantages to be obtained by this invention. According to the present invention, in case the so-called "torque compensation" cannot be executed because of the restriction of the running control, the gear shift in the transmission is executed at the timing appropriate for the torque generated on the output member. Therefore, it is possible to lighten or prevent the shocks accompanying the gear shift.

According to this invention, moreover, the shift point is changed in case the energy accumulator cannot output the energy sufficiently or cannot accept the energy, so that the shocks are lightened or prevented.

According to this invention, moreover, in case the change in the output torque at the shifting time in the transmission cannot be suppressed sufficiently by the regenerative torque, the gear shift is executed in the relatively low load state. Therefore, the change in the torque as might otherwise accompany the gear shift becomes so small that the fluctuation of the torque itself is small. Accordingly, the change in the output torque can be suppressed so as not to cause shocks even if the regenerative torque is small.

According to this invention, still moreover, the gear shift is executed in the relatively low load state, even when the change in the regenerative torque is small because of the restriction on the regenerative control by the regenerating mechanism of the first prime mover. Therefore, it is possible to suppress or prevent the shocks.

According to this invention, on the other hand, the gear shift of the case in which any of the prime mover cannot be sufficiently controlled to suppress the change in the output torque at the shifting time, is caused relatively in the low speed state. As a result of this, the time period necessary for the gear shift is shorten so that the torque change due to the gear shift under the state where any of the prime movers cannot be sufficiently controlled, is ended in a short period of time. Therefore, the shocks as might otherwise accompany the gear shift becomes hard to be felt or light. In addition to this, in case the gear shift is executed by the frictional engagement device, the amount of energy to be absorbed by the frictional member becomes small. Therefore, it is possible to improve the durability of the frictional engagement device.

According to this invention, moreover, the shift point to decide the gear shift in the transmission is changed relatively to the low load side. Therefore, the change in the output torque as might otherwise accompany the gear shift in the transmission becomes small so that the shocks are hard to occur. Moreover, the change in the output torque is also suppressed by the restricted running control of any of the prime movers. Therefore, shocks are prevented or relaxed also in this respect.

According to this invention, moreover, the gear shift is caused in the low load state so that the change in the output torque can be suppressed even if the torque is a small corrected torque of the second prime mover. As a result, the shocks are prevented or relaxed.

According to this invention, still moreover, in case the running control of any of the prime movers is restricted by the allowable output amount or the acceptance capacity of the energy accumulator, the gear ratio at the starting time of the vehicle is kept so as not to cause the gear shift in the transmission. Therefore, the gear shift is not caused in the state where the correction of the torque by any of the prime movers cannot be sufficiently executed, so that it is possible to prevent the shocks from deterioration.

According to the invention, moreover, the gear shift in the transmission is regulated, in the state where the vehicle is run by the second prime mover connected through the transmission to the output member. Therefore, the gear shift and the accompanying fluctuation of the torque is not caused, or the fluctuation is regulated, under the state where the output torque cannot be so-called "compensated" by the first prime mover, so that the shocks are suppressed or prevented.

According to the invention, still moreover, the output torque of the first prime mover is corrected to the rising side at the shifting time in the transmission, in the state where the torque can be outputted from the first prime mover in which the output member is connected, and the torque can be raised. Therefore, the torque of the output member during the shifting operation in the transmission is compensated by the torque of the first prime mover, and the fall of the output torque at the shifting time or the shock as might otherwise result from the fall of the output torque can be prevented or suppressed.

What is claimed is:

1. A control device of a hybrid drive unit, wherein an output member is connected to a first prime mover, and wherein a second prime mover capable of outputting at least one of a positive torque and a negative torque is connected through a transmission to said output member, wherein said first prime mover comprises: an internal combustion engine; a first motor having a regenerating function; and a gear mechanism for performing a differential action to distribute the output torque of said internal combustion engine to said first motor and said output member, and wherein the second prime mover comprises a second motor having a regenerating function, comprising:
   a running restriction judging means for judging that a running control of at least one of said first prime mover and said second prime mover is restricted, and
   a shift point changing means for changing a shift point, in which a decision of a gear shift of said transmission is to be satisfied when the running restriction judging means judges that said running control is restricted, different from the shift point of a case in which said running control is not restricted.

2. A control device of a hybrid drive unit according to claim 1 further comprising:
   an energy accumulator for outputting an energy to said first prime mover or second prime mover, or charging an energy regenerated by any of said prime movers; and
   wherein said running restriction judging means includes a means for judging said running restriction on the basis of a condition of said energy accumulator.

3. A control device of a hybrid drive unit according to claim 2,
   wherein said running restriction judging means includes a means for judging the restriction on said running control in ease the acceptance capacity of said energy accumulator for energy is smaller than a predetermined value, and;
   wherein said shift point changing means includes a means for changing said shift point to a low load side where the demand load against said hybrid drive unit is relatively low, in case the restriction on said running control is judged.

4. A control device of a hybrid drive unit according to claim 3,
   further comprising: an output torque correcting means for correcting the torque to be transmitted from said first prime mover to said output member to a rising side, by changing a regeneration amount of the energy of said first motor at said shifting time.

5. A control device of a hybrid drive unit according to claim 2,
   wherein a status of said energy accumulator is at least any of an allowable output amount as an energy amount possible to be outputted from said energy accumulator, and an acceptance capacity of said energy accumulator for energy;
   wherein said running restriction judging means includes a means for judging the restriction on said running control, in case said allowable output amount or acceptance capacity is smaller than the predetermined value, and;
   wherein said shift point changing means includes a means for changing said shift point relatively to the low speed side, in case the restriction on said running control is judged.

6. A control device of a hybrid drive unit according to claim 2,
   wherein a status of said energy accumulator is an energy amount possible to be outputted from said energy accumulator;
   wherein said running restriction judging means includes a means for judging the restriction on said running control, in case said allowable output amount is smaller than the predetermined value, and;
   wherein said shift point changing means includes a means for changing said shift point relatively to the low load side where the demand load against said hybrid drive unit is relatively small.

7. A control device of a hybrid vehicle unit according to claim 6,
   wherein any of said prime movers is said second prime mover including a drive mechanism for outputting the torque by receiving the energy from said energy accumulator, and
   further comprising: a drive controlling means for outputting the torque from said drive mechanism at said shifting time of the transmission.

8. A control device of a hybrid drive unit according to claim 2,
   wherein a status of said energy accumulator is at least any of an allowable output amount as an energy amount possible to be outputted from said energy accumulator, and an acceptance capacity of said energy accumulator for energy;
   wherein said running restriction judging means includes a means for judging the restriction on said running control, in case said allowable output amount or acceptance capacity is smaller than the predetermined value; and
   further comprising: a gear ratio fixing means for fixing the gear ratio of said transmission from a starting time of a vehicle having said hybrid drive unit, in case the restriction on said running control is judged.

9. A control device of a hybrid drive unit according to claim 1,
   wherein said second motor includes an electric motor for outputting a motive power to run the vehicle to said output member with said first prime mover being stopped; and further comprising: a gear shift regulating means for regulating the gear shift in said transmission, in case the vehicle is run by the motive power outputted from said electric motor.

10. A control device of a hybrid drive unit according to claim 9, further comprising:
a shifting time torque correcting means for correcting the torque outputted from said first prime mover at the shifting time in said transmission to the rising side.

11. A control device of a hybrid drive unit according to claim 1,
wherein said gear mechanism includes a planetary gear mechanism having: an input element to which the torque of said internal combustion engine is inputted; a reaction element to which said motor is connected; and an output element to which said output member is connected.

12. A control device of a hybrid drive unit according to claim 1,
wherein said gear mechanism includes a single pinion type planetary gear mechanism having: a sun gear to which the torque of said internal combustion engine is inputted; a carrier to which said motor is connected; and a ring gear to which said output member is connected.

13. A control device of a hybrid drive unit according to claim 1,
wherein said transmission includes a mechanism capable of interchanging the gear ratio between high and low.

14. A control device of a hybrid drive unit according to claim 13,
wherein said mechanism includes a Ravignaux type planetary gear mechanism.

15. A control device of a hybrid drive unit according to claim 1,
wherein said transmission comprises: a first sun gear fixed selectively; a ring gear arranged concentrically with said first sun gear; a first pinion gear meshing with said first sun gear; a second pinion gear meshing with said ring gear; a carrier holding those pinion gears and joined to said output member; and a second sun gear meshing with said second pinion gear and joined to said second prime mover.

16. A control method of a hybrid drive unit, wherein an output member is connected to a first prime mover, and wherein a second prime mover capable of outputting at least one of a positive torque and a negative torque is connected through a transmission to said output member, wherein said first prime mover comprises: an internal combustion engine; a first motor having a regenerating function; and a gear mechanism for performing a differential action to distribute the output torque of said internal combustion engine to said first motor and said output member, and wherein the second prime mover comprises a second motor having a regenerating function, comprising:
a judging step for judging that a running control of at least one of said first prime mover and said second prime mover is restricted, and
a shift point changing step for changing a shift point, in which a decision of a gear shift of said transmission is to be satisfied when the judging step judges that said running control is restricted, different from the shift point of a case in which the running control is not restricted.

17. A control device of a hybrid drive unit, wherein an output member is connected to a first prime mover, and wherein a second prime mover capable of outputting at least one of a positive torque and a negative torque is connected through a transmission to said output member, wherein said first prime mover comprises: an internal combustion engine; a first motor having a regenerating function; and a gear mechanism for performing a differential action to distribute the output torque of said internal combustion engine to said first motor and said output member, and wherein the second prime mover comprises a second motor having a regenerating function, comprising:
a running restriction judger for judging that a running control of at least one of said first prime mover and said second prime mover is restricted, and
a shift point changer for changing a shift point, in which a decision of a gear shift of said transmission is to be satisfied when the running restriction judger judges that said running control is restricted, different from the shift point of a case in which said running control is not restricted.

18. A control device of a hybrid drive unit, wherein an output member is connected to a first prime mover, and wherein a second prime mover capable of outputting at least one of a positive torque and a negative torque is connected through a transmission to said output member, comprising:
a running restriction judging means for judging that a running control of at least one of said first prime mover and said second prime mover is restricted,
a shift point changing means for changing a shift point, in which a decision of a gear shift of said transmission is to be satisfied when the running restriction judging means judges that said running control is restricted, different from the shift point of a case in which said running control is not restricted,
an energy accumulator for outputting an energy to said first prime mover or second prime mover, or charging an energy regenerated by any of said prime movers;
wherein said running restriction judging means includes a means for judging said running restriction on the basis of a condition of said energy accumulator,
wherein at least any of said first prime mover and second primer mover regenerates the energy;
wherein said running restriction judging means includes a means for judging the restriction on said running control in case the acceptance capacity of said energy accumulator for energy is smaller than a predetermined value; and
wherein said shift point changing means includes a means for changing said shift point to a low load side where the demand load against said hybrid dive unit is relatively low, in case the restriction on said running control is judged.

19. A control device of a hybrid drive unit according to claim 18
wherein said first prime mover includes a regenerating mechanism for regenerating the energy, and further comprising:
an output torque correcting means for correcting the torque to be transmitted from said first prime mover to said output member to a rising side, by changing a regeneration amount of the energy of said regenerating mechanism at said shifting time.

20. A control device of a hybrid drive unit, wherein an output member is connected to a first prime mover, and wherein a second prime mover capable of outputting at least one of a positive torque and a negative torque is connected through a transmission to said output member, comprising:

a running restriction judging means for judging that a running control of at least one of said first prime mover and said second prime mover is restricted, a shift point changing means for changing a shift point, in which a decision of a gear shift of said transmission is to be satisfied when the running restriction judging means judges that said running control is restricted, different from the shift point of a case in which said running control is not restricted, an energy accumulator for outputting any energy to said first prime mover or second prime mover, or charging an energy regenerated by an of said prime movers;

wherein said running restriction judging means includes a means for judging said running restriction on the basis of a condition of said energy accumulator, wherein a status of said energy accumulator is at least any of an allowable output amount as an energy amount possible to be outputted from said energy accumulator, and an acceptance capacity of said energy accumulator for energy;

wherein said running restriction judging means includes a means for judging the restriction on said running control, in case said allowable output amount or acceptance cpacity is smaller than the predetermined value; and wherein said shift point changing means includes a means for changing said shift point relatively to the low speed side, in case the restriction on said running control is judged.

21. A control device of a hybrid drive unit, wherein an output member is connected to a first prime mover, and wherein a second prime mover capable of outputting at least one of a positive torque and a negative torque is connected through a transmission to said output member, comprising:

an energy accumulator for outputting an energy to said first prime mover or second prime mover, or charging an energy regenerated by any of said prime movers;

a running restriction judging means for judging that a running control of at least one of said first primer mover and said second prime mover is restricted in case said allowable output amount from the energy accumulator is smaller than the predetermined value, and a shift point changing means for changing a shift point, in which a decision of a gear shift of said transmission is to be satisfied when the running restriction judging means judges that said running control is restricted, relatively to the low load side where the demand load against said hybrid drive unit is relatively small, wherein any of said primer movers is said second prime mover including a drive mechanism for outputting the torque by receiving the energy from said energy accumulator, and further comprising: a drive controlling means for outputting the torque from said drive mechanism at said shifting time of the transmission.

22. A control device of a hybrid drive unit, wherein an output member is connected to a first prime mover, and wherein a second prime mover capable of outputting at least one of a positive torque and a negative torque is connected through a transmission to said output member, comprising:

a running restriction judging means for judging that a running control of at least one of said first prime mover and said second prime mover is restricted, a shift point changing means for changing a shift point, in which a decision of a gear shift of said transmission is to be satisfied when the running restriction judging means judges that said running control is restricted, different from the shift point of a case in which said running control is not restricted, an energy accumulator for outputting an energy to said first prime mover or second prime mover, or charging an energy regenerated by any of said prime movers;

wherein said running restriction judging means includes a means for judging said running restriction on the basis of a condition of said energy accumulator, wherein a status of said energy accumulator is at least any of an allowable output amount as an energy amount possible to be outputted from said energy accumulator, and an acceptance capacity of said energy accumulator for energy;

wherein said running restriction judging means includes a means for judging the restriction on said running control, in case said allowable output amount or acceptance capacity is smaller than the predetermined value; and further comprising: a gear ratio fixing means for fixing the gear ratio of said transmission from a starting time of a vehicle having said hybrid drive unit, in case the restriction on said running control is judged.

23. A control device of a hybrid drive unit, wherein an output member is connected to a first prime mover, and wherein a second prime mover capable of outputting at least one of a positive torque and a negative torque is connected through a transmission to said output member, comprising:

a running restriction judging means for judging that a running control of at least one of said first prime mover and said second primer mover is restricted, and a shift point changing means for changing a shift point, in which a decision of a gear shift of said transmission is to be satisfied when the running restriction judging means judges that said running control is restricted, different from the shift point of a case in which said running control is not restricted;

wherein said second prime mover includes an electric motor for outputting a motive power to run the vehicle to said output member with said first prime mover being stopped; and further comprising: a gear shift regulating means for regulating the gear shift in said transmission, in case the vehicle is run by the motive power outputted from said electric motor.

24. A control device of a hybrid drive unit according to claim 23, further comprising:

a shifting time torque correcting means for correcting the torque outputted from said first prime mover at the shifting time in said transmission to the rising side.

25. A control device of a hybrid drive unit, wherein an output member is connected to a first prime mover, and wherein a second prime mover capable of outputting at lease one of a positive torque and a negative torque is connected through a transmission to said output member, comprising:

a running restriction judging means for judging that a running control of at least one of said first prime mover and said second prime mover is restricted, a shift point changing means for changing a shift point, in which a decision of a gear shift of said transmission is to be satisfied when the running restriction judging means judges that said running control is restricted, different from the shift point of a case in which said running control is not restricted, wherein said transmission comprises: a first sun gear fixed selectively; a ring gear arranged concentrically with said first sun gear; a first pinion gear meshing with said first sun gear; a second pinion gear meshing with said ring gear; a carrier holding those pinion gears and joined to said output member; and a second sun gear mashing with said second pinion gear and joined to said second prime mover.

26. A control device of a hybrid drive unit, wherein an output member is connected to a first prime mover, and wherein a second prime mover capable of outputting at least one of a positive torque and a negative torque is connected through a transmission to said output member, wherein said first prime mover comprises: an internal combustion engine; a first motor having a regenerating function; and a gear mechanism for performing a differential action to distribute the power of said internal combustion engine to said first motor and said output member, and wherein the second prime mover comprises a second motor having a regenerating function, comprising:

a running restriction judging means for judging that a runner control of at least one of said first prime mover and said second prime mover is restricted, and a shift point changing means for changing a shift point, in which a decision of a gear shift of said transmission is to be satisfied when the running restriction judging means judges that said running control is restricted, different from the shift point of a case in which said running control is not restricted.

27. A control method of a hybrid drive unit, wherein an output member is connected to a first prime mover, and wherein a second prime mover capable of outputting at least one of a positive torque and a negative torque is connected through a transmission to said output member, wherein said first prime mover comprises: an internal combustion engine; a first motor having a regenerating function; and a gear mechanism for performing a differential action to distribute the power of said internal combustion engine to said first motor and said output member, and wherein the second prime mover comprises a second motor having a regenerating function, comprising:

a judging step for judging that a running control of at least one of said first prime mover and said second prime mover is restricted, and a shift point changing step for changing a shift point, in which a decision of a gear shift of said transmission is to be satisfied when the judging step judges that said running control is restricted, different from the shift point of a case in which the running control is not restricted.

28. A control device of a hybrid drive unit, wherein an output member is connected to a first prime mover, and wherein a second prime mover capable of outputting at least one of a positive torque and a negative torque is connected through a transmission to said output member, wherein said first prime mover comprises: an internal combustion engine; a first motor having a regenerating function; and a gear mechanism for performing a differential action to distribute the power of said internal combustion engine to said first motor and said output member, and wherein the second prime mover comprises a second motor having a regenerating function, comprising:

a running restriction judger for judging that a running control of at least one of said first prime mover and said second prime mover is restricted, and a shift point changer for changing a shift point, in which a decision of a gear shift of said transmission is to be satisfied when the running restriction judger judges that said running control is restricted, different from the shift point of a case in which said running control is not restricted.

* * * * *